US012636718B2

(12) United States Patent (10) Patent No.: US 12,636,718 B2
Kuriyama (45) Date of Patent: May 26, 2026

(54) CUTTING TOOL, TOOL SYSTEM AND CUTTING INFORMATION TRANSMISSION METHOD

(71) Applicant: Sumitomo Electric Industries, Ltd., Osaka (JP)

(72) Inventor: Hiromitsu Kuriyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 661 days.

(21) Appl. No.: 17/793,054

(22) PCT Filed: Jan. 28, 2021

(86) PCT No.: PCT/JP2021/002985
§ 371 (c)(1),
(2) Date: Jul. 15, 2022

(87) PCT Pub. No.: WO2021/153655
PCT Pub. Date: May 5, 2021

(65) Prior Publication Data
US 2023/0064164 A1 Mar. 2, 2023

(30) Foreign Application Priority Data
Jan. 31, 2020 (WO) ................. PCT/JP2020/003723

(51) Int. Cl.
B23C 5/00 (2006.01)

(52) U.S. Cl.
CPC .......... B23C 5/006 (2013.01); B23C 2260/76 (2013.01)

(58) Field of Classification Search
CPC ........ B23B 2260/128; B23B 2270/486; B23B 2270/483; B23B 2270/48; B23B 29/12; B23Q 17/0952; B23Q 17/099; B23Q 17/10; B23Q 17/09; B23Q 2717/003
See application file for complete search history.

(56) References Cited

U.S. PATENT DOCUMENTS

| | | | |
|---|---|---|---|
| 5,921,726 A | 7/1999 | Shiozaki et al. | |
| 11,275,351 B2 | 3/2022 | Holmstrom | |
| 2016/0303698 A1 | 10/2016 | Takahashi et al. | |
| 2017/0144238 A1* | 5/2017 | Ishii ..................... | B23F 23/006 |

(Continued)

FOREIGN PATENT DOCUMENTS

| | | |
|---|---|---|
| JP | 62-136345 A | 6/1987 |
| JP | 7-195258 A | 8/1995 |

(Continued)

OTHER PUBLICATIONS

JP-2012020359-A Espacenet translation (Year: 2012).*
JP-2018065199-A (Year: 2018).*

*Primary Examiner* — Sunil K Singh
*Assistant Examiner* — Dustin James Trujillo
(74) *Attorney, Agent, or Firm* — XSENSUS LLP

(57) ABSTRACT

A cutting tool includes: a cutting section having a cutting edge; a sensor provided in the cutting section; and a communication unit provided in the cutting section. The communication unit transmits, to a processing device provided outside the cutting tool, measurement information relating to measurement results of the sensor and including serial numbers corresponding to the measurement results after a timing of a start of cutting by the cutting edge.

18 Claims, 17 Drawing Sheets

300

(56) References Cited

U.S. PATENT DOCUMENTS

| | | |
|---|---|---|
| 2019/0299352 A1 | 10/2019 | Michiwaki |
| 2020/0059890 A1 | 2/2020 | Fukuda et al. |

FOREIGN PATENT DOCUMENTS

| | | | |
|---|---|---|---|
| JP | 9-285945 A | | 11/1997 |
| JP | 2012-20359 A | | 2/2012 |
| JP | 2012020359 A | * | 2/2012 |
| JP | 2013-6257 A | | 1/2013 |
| JP | 2014-98983 A | | 5/2014 |
| JP | 2015-77658 A | | 4/2015 |
| JP | 2018-43339 A | | 3/2018 |
| JP | 2018-65199 A | | 4/2018 |
| JP | 2018065199 A | * | 4/2018 |
| JP | 2018-78435 A | | 5/2018 |
| JP | 2018-534680 A | | 11/2018 |
| JP | 2019-42831 A | | 3/2019 |

* cited by examiner

FIG. 2
401
UNIT: OCTET
| 5 | 11 | 20 |
|---|---|---|
| SYNCHRONIZATION HEADER | MAC HEADER | SENSOR DATA |
FIG. 3
100A
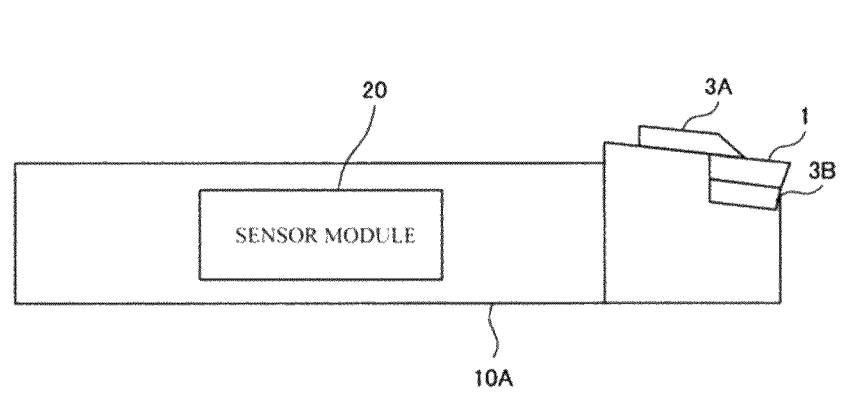
20
SENSOR MODULE
3A
1
3B
10A
FIG. 4
100B
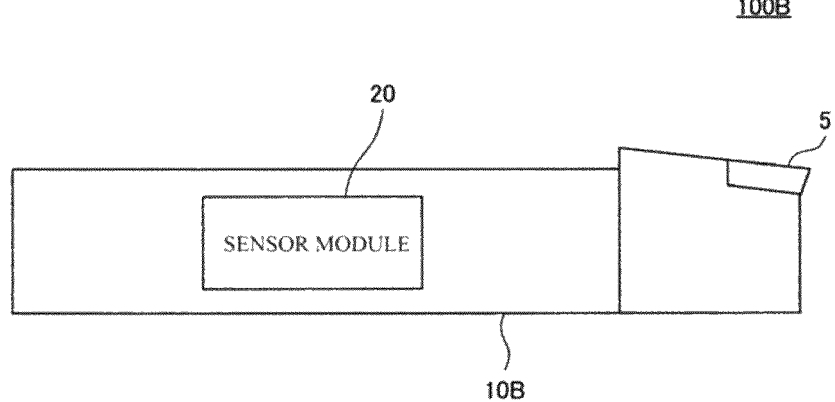
20
SENSOR MODULE
5
10B

FIG. 8

| TYPE ID | SENSOR MEASURED VALUE ($\mu$ST) | TYPE ID | SENSOR MEASURED VALUE (mG) |
|---|---|---|---|
| 1 | 102 | 2 | 10000 |
| 1 | 101 | 2 | −8000 |
| 1 | 103 | 2 | 2000 |
| 1 | 103 | 2 | 3000 |
| 1 | 102 | 2 | 1000 |
| 1 | 10 | 2 | 10 |

FIG. 9

| SENSOR ID | SENSOR MEASURED VALUE ($\mu$ST) | SENSOR ID | SENSOR MEASURED VALUE ($\mu$ST) | SENSOR ID | SENSOR MEASURED VALUE ($\mu$ST) | SENSOR ID | SENSOR MEASURED VALUE ($\mu$ST) |
|---|---|---|---|---|---|---|---|
| 1 | 102 | 2 | 52 | 3 | −95 | 4 | 102 |
| 1 | 101 | 2 | 51 | 3 | −95 | 4 | 102 |
| 1 | 103 | 2 | 49 | 3 | −98 | 4 | 102 |
| 1 | 103 | 2 | 50 | 3 | −96 | 4 | 102 |
| 1 | 102 | 2 | 52 | 3 | −93 | 4 | 102 |
| 1 | 10 | 2 | 5 | 3 | −9 | 4 | 102 |

FIG. 10

| TYPE ID | SENSOR ID | SENSOR MEASURED VALUE (μST) | TYPE ID | SENSOR ID | SENSOR MEASURED VALUE (μST) | TYPE ID | SENSOR ID | SENSOR MEASURED VALUE (mG) | TYPE ID | SENSOR ID | SENSOR MEASURED VALUE (mG) |
|---|---|---|---|---|---|---|---|---|---|---|---|
| 1 | 1 | 102 | 1 | 2 | -95 | 2 | 1 | 10000 | 2 | 2 | 5000 |
| 1 | 1 | 101 | 1 | 2 | -95 | 2 | 1 | -8000 | 2 | 2 | -4000 |
| 1 | 1 | 103 | 1 | 2 | -98 | 2 | 1 | 2000 | 2 | 2 | 1000 |
| 1 | 1 | 103 | 1 | 2 | -96 | 2 | 1 | 3000 | 2 | 2 | 1500 |
| 1 | 1 | 102 | 1 | 2 | -93 | 2 | 1 | 1000 | 2 | 2 | 500 |
| 1 | 1 | 10 | 1 | 2 | -9 | 2 | 1 | 10 | 2 | 2 | 5 |

FIG. 11

| GENERATION TIME (msec) | SENSOR MEASURED VALUE ($\mu$ST) |
|---|---|
| 0.000 | 102 |
| 0.001 | 101 |
| 0.002 | 103 |
| 0.003 | 103 |
| 0.004 | 102 |
| 0.005 | 10 |

FIG. 12

| SEQUENCE NUMBER | SENSOR MEASURED VALUE ($\mu$ST) |
|---|---|
| 0 | 102 |
| 1 | 101 |
| 2 | 103 |
| 3 | 103 |
| 4 | 102 |
| 5 | 10 |

| SEQUENCE NUMBER | SENSOR MEASURED VALUE ($\mu$ ST) |
|---|---|
| 0 | 10 |
| 0 | 10 |
| 0 | 10 |
| 1 | 103 |
| 2 | 103 |
| 3 | 102 |
| 4 | 101 |
| 5 | 102 |
| 6 | 10 |
| 7 | 10 |

FIG. 18

| CUTTING FLAG | SENSOR MEASURED VALUE ($\mu$ ST) |
|---|---|
| 0 | 10 |
| 0 | 10 |
| 0 | 10 |
| 1 | 103 |
| 1 | 103 |
| 1 | 102 |
| 1 | 101 |
| 1 | 102 |
| 0 | 10 |
| 0 | 10 |

FIG. 19

| PITCH NUMBER | SENSOR MEASURED VALUE (μST) |
|---|---|
| 0 | 10 |
| 0 | 10 |
| 0 | 10 |
| 1 | 103 (Sr) |
| 1 | 103 |
| 1 | 102 |
| 1 | 101 |
| 1 | 102 |
| 1 | 10 |
| 1 | 10 |
| 1 | 10 |
| 1 | 10 |
| 1 | 10 |
| 2 | 103 (Sr) |
| 2 | 102 |
| 2 | 101 |
| 2 | 102 |
| 2 | 102 |
| 2 | 10 |
| ⋮ | ⋮ |
| 36 | 102 |
| 36 | 103 |
| 36 | 10 |
| 36 | 10 |
| 36 | 10 |
| 36 | 10 |
| 36 | 10 |
| 1 | 103 (Sr) |
| 1 | 103 |

FIG. 20

| ROTATIONAL PHASE (degree) | SENSOR MEASURED VALUE ($\mu$ST) |
|---|---|
| 0 | 10 |
| 0 | 10 |
| 36 | 103 (Sr1) |
| 72 | 103 |
| 108 | 102 |
| 144 | 101 |
| 180 | 102 |
| 216 | 10 |
| 252 | 10 |
| 288 | 10 |
| 324 | 10 |
| 360 | 10 |
| 36 | 103 (Sr2) |
| 72 | 102 |
| 108 | 101 |
| 144 | 102 |
| 180 | 102 |
| 216 | 10 |
| $\vdots$ | $\vdots$ |

1

CUTTING TOOL, TOOL SYSTEM AND CUTTING INFORMATION TRANSMISSION METHOD

CROSS-REFERENCE TO RELATED APPLICATIONS

The present application is based on PCT/JP2021/002985 filed on Jan. 28, 2021, which claims priority to PCT/JP2020/003723, filed on Jan. 31, 2020, the entire contents of each are incorporated herein by reference.

TECHNICAL FIELD

The present disclosure relates to a cutting tool, a tool system and a cutting information transmission method.

BACKGROUND ART

PTL 1 (Japanese Unexamined Patent Application Publication No. 2018-43339) discloses a cutting head with a conducting path as follows. Specifically, the cutting head with a conducting path is a cutting tool to cut an object or a holder to hold the cutting tool, and a conducting path to measure a change in the member is directly or indirectly formed in whole or part of a member of the cutting tool or the holder.

In addition, PTL 2 (Japanese Unexamined Patent Application Publication (Translation of PCT Application) No. 2018-534680) discloses the method as follows. Specifically, the method provides a method (300) to be performed in a control system (110) including a programmable logic control unit (111) configured to control the operation of a machine (200), and a numerical value control unit (112) configured to control a relative movement between a tool (210) of the machine and a workpiece (220), the method including: evaluating (310) an input signal (190) received by the programmable logic control unit as a first condition, the input signal containing information including a state of the tool or a state of a subtraction process performed by the interaction between the tool and the workpiece; and in response to the input signal satisfying the first condition, providing (320) the information to the numerical value control unit.

CITATION LIST

Patent Literature

PTL 1: Japanese Unexamined Patent Application Publication No. 2018-43339
PTL 2: Japanese Unexamined Patent Application Publication (Translation of PCT Application) No. 2018-534680

SUMMARY OF INVENTION

A cutting tool of the present disclosure includes: a cutting section having a cutting edge; a sensor provided in the cutting section; and a communication unit provided in the cutting section, wherein the communication unit transmits, to a processing device provided outside the cutting tool, measurement information which relates to a measurement result of the sensor and includes a serial number corresponding to the measurement result after a timing of a start of cutting by the cutting edge.

A tool system of the present disclosure includes: a cutting tool including a sensor and a communication unit; and a processing device installed outside the cutting tool. The cutting tool transmits, to the processing device, measurement information which relates to a measurement result of the sensor and includes a serial number corresponding to the measurement result after a timing of a start of cutting by the cutting edge, and the processing device processes the measurement information received from the cutting tool.

A cutting information transmission method of the present disclosure is for a cutting tool including a cutting section having a cutting edge and a sensor provided in the cutting section, and the method includes: a step of performing cutting machining on a workpiece by the cutting section; a step of transmitting, to a processing device provided outside the cutting tool, measurement information which relates to a measurement result of the sensor at a time of the cutting machining and includes a serial number corresponding to the measurement result after a timing of a start of cutting by the cutting edge.

An aspect of the present disclosure may be implemented not only as a cutting tool including such a characteristic processing unit, but also as a semiconductor integrated circuit that implements part or whole of the cutting tool, and may be implemented as a program that causes a computer to execute the steps of processing in the cutting tool. An aspect of the present disclosure may be implemented not only as a tool system including such a characteristic processing unit, but also as a method including the steps of such characteristic processing, and may be implemented as a semiconductor integrated circuit that implements part or whole of the tool system.

BRIEF DESCRIPTION OF DRAWINGS

FIG. 2 is a chart illustrating an example of a sensor packet transmitted by a cutting tool according to an embodiment of the present disclosure.

FIG. 3 is a diagram illustrating an example of the configuration of the cutting tool according to an embodiment of the present disclosure.

FIG. 4 is a diagram illustrating another example of the configuration of the cutting tool according to an embodiment of the present disclosure.

FIG. 8 is a chart illustrating an example of measurement information generated by a processing unit according to an embodiment of the present disclosure.

FIG. 9 is a chart illustrating an example of measurement information generated by the processing unit according to an embodiment of the present disclosure.

FIG. 10 is a chart illustrating an example of measurement information generated by the processing unit according to an embodiment of the present disclosure.

FIG. 11 is a chart illustrating an example of measurement information generated by the processing unit according to an embodiment of the present disclosure.

FIG. 12 is a chart illustrating an example of measurement information generated by the processing unit according to an embodiment of the present disclosure.

FIG. 14 is a chart illustrating temporal variations of strain measured by a strain sensor in the sensor module according to an embodiment of the present disclosure.

FIG. 17 is a chart illustrating an example of measurement information generated by the processing unit according to an embodiment of the present disclosure.

FIG. 18 is a chart illustrating an example of measurement information generated by the processing unit according to an embodiment of the present disclosure.

FIG. 19 is a chart illustrating an example of pitch numbers in measurement information generated by the processing unit according to an embodiment of the present disclosure.

FIG. 20 is a chart illustrating an example of a rotational phase in measurement information generated by the processing unit according to an embodiment of the present disclosure.

DESCRIPTION OF EMBODIMENTS

Figure 1:
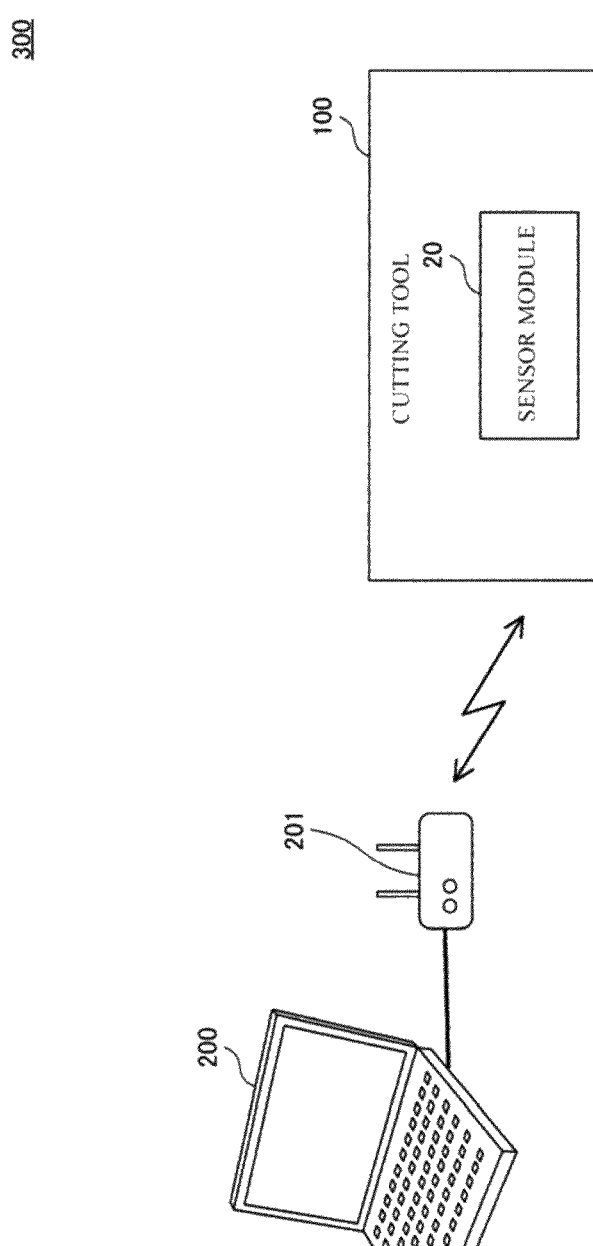
FIG. 1 is a diagram illustrating a configuration of a tool system according to an embodiment of the present disclosure.

A technique to monitor the state of a cutting tool has been known.

Problems to be Solved by Present Disclosure

A technique superior to the one described in PTL 1 and PTL 2 is desired that can implement an excellent function related to determination of the state of the cutting edge of a cutting tool.

The present disclosure has been made to solve the above-described issue, and an object thereof is to provide a cutting tool, a tool system, and a cutting information transmission method that are capable of implementing an excellent function related to determination of the state of the cutting edge of the cutting tool.

Advantageous Effects of Present Disclosure

According to the present disclosure, it is possible to implement an excellent function related to determination of the state of the cutting edge of the cutting tool.

Description of Embodiments of Present Disclosure

First, the contents of embodiments of the present disclosure will be described in order.

(1) A cutting tool according to an embodiment of the present disclosure includes: a cutting section having a cutting edge; a sensor provided in the cutting section; and a communication unit provided in the cutting section. The communication unit transmits, to a processing device provided outside the cutting tool, measurement information which relates to a measurement result of the sensor and includes a serial number corresponding to the measurement result after a timing of a start of cutting by the cutting edge.

With this configuration of transmitting measurement information to the processing device, the state of the cutting edge can be determined based on, for example, the information, such as machining conditions, owned by a machine tool with the cutting tool attached, and measurement information from the cutting tool in the processing device. Thus, the state of the cutting edge can be determined more accurately, as compared to the configuration in which the state of the cutting edge is determined based on the measurement information only. In addition, with the configuration of transmitting measurement information including serial numbers corresponding to measurement results to the processing device, for example, in the configuration of wirelessly transmitting the measurement information to the processing device, even when reception order in the processing device is not linked to the measurement order due to retransmission or the like of the measurement information, it is possible to recognize the measurement order of the measurement results accurately in the processing device. In addition, due to the configuration of transmitting, to the processing device, measurement information including serial numbers corresponding to the measurement results after the timing of the start of cutting by the cutting edge, the measurement results after the start of cutting machining can be easily extracted and analyzed in the processing device. Therefore, it is possible to implement an excellent function related to determination of the state of the cutting edge of the cutting tool.

(2) Preferably, the communication unit transmits, to the processing device, measurement information including determination information which corresponds to the measurement result and indicates whether the measurement result is for when cutting is carried out by the cutting edge.

With this configuration, a measurement result when cutting is carried out by the cutting edge can be easily extracted and analyzed in the processing device.

(3) Preferably, the cutting tool includes a plurality of sensors, and the communication unit transmits the measurement information including identification information of the sensors to the processing device.

With this configuration, in the cutting tool including a plurality of sensors disposed at different positions, the measurement information indicating the measurement results of the sensors at the positions can be easily distinguished and transmitted to the processing device.

(4) Preferably, the communication unit transmits, to the processing device, the measurement information including a measurement time corresponding to the measurement result.

With this configuration, for example, in the configuration of wirelessly transmitting the measurement information to the processing device, even when reception times in the processing device do not link to the measurement times due to retransmission or the like of the measurement information, it is possible to recognize the measurement times accurately in the processing device.

(5) Preferably, the cutting tool further includes a battery provided in the cutting section, the sensors are driven by electric power supplied from the battery, and the communication unit further transmits voltage information indicating a voltage of the battery to the processing device.

With this configuration, notification to prompt a user to replace a battery can be made in the processing device.

(6) Preferably, the communication unit transmits, to the processing device, the measurement information including a plurality of measurement results, each of which is the measurement result, at different measurement timings.

With this configuration, transmission frequency of the measurement information can be reduced, and the measurement information can be efficiently transmitted to the processing device, thus, particularly, in the configuration of wirelessly transmitting the measurement information to the processing device, increase in the traffic can be prevented, and interference or the like can be reduced.

(7) Preferably, the communication unit transmits, to the processing device for every generation period of the measurement result, the measurement information including the corresponding single measurement result.

With this configuration, a plurality of measurement results do not need to be stored in a memory in the period from generation of a measurement result to a transmission timing of the measurement information, thus, the memory capacity in the cutting tool can be reduced.

(8) Preferably, the communication unit transmits, to the processing device for every period of an integral multiple of the generation period of the measurement result, the measurement information including corresponding one or multiple ones of the measurement results.

With this configuration, transmission frequency of the measurement information can be reduced, thus, particularly, in the configuration of wirelessly transmitting the measurement information to the processing device, increase in the traffic can be prevented, and interference or the like can be reduced.

(9) Preferably, the cutting tool is a tool for turning machining, used to machine a rotating workpiece, and the communication unit transmits the measurement information including corresponding one or multiple ones of the measurement results to the processing device at a timing in accordance with the number of revolutions of the workpiece.

With this configuration, for example, when the cutting edge comes into contact with a workpiece periodically according to the rotation of the workpiece, a processor or the like can perform a process of generating a measurement result when the cutting edge is in contact with the workpiece, and can perform a process of transmitting the measurement information when the cutting edge is not in contact with the workpiece, thus the measurement information can be transmitted smoothly even with use of a processor having a relatively low throughput.

(10) Preferably, the communication unit transmits, to the processing device, the measurement information including phase information which corresponds to the measurement result, and relates to a phase of cutting machining after the timing of the start of cutting by the cutting edge.

With this configuration, measurement results in phase can be extracted, and the measurement results can be analyzed for each phase.

(11) Preferably, a plurality of projections are formed on an outer circumference of the workpiece, and the communication unit transmits, to the processing device, the measurement information including identification information of the projections as the phase information.

With this configuration, projections where a cutting abnormality is likely to occur can be identified based on the analysis of the measurement results.

(12) Preferably, the communication unit transmits, to the processing device, the measurement information including rotational phase information which corresponds to the measurement result, and relates to the phase of cutting machining between the plurality of projections.

With this configuration, projections where a cutting abnormality is likely to occur can be identified based on the analysis of the measurement results.

(13) Preferably, the cutting tool is a tool for rotational machining, used to machine a fixed workpiece, and the communication unit transmits, to the processing device, the measurement information including corresponding one or multiple ones of the measurement results at a timing in accordance with the number of revolutions of the cutting tool.

With this configuration, for example, when the cutting edge comes into contact with a workpiece periodically according to the rotation of the cutting tool, a processor or the like can perform a process of generating a measurement result when the cutting edge is in contact with the workpiece, and can perform a process of transmitting measurement information when the cutting edge is not in contact with the workpiece, thus the measurement information can be transmitted smoothly even with use of a processor having a relatively low throughput.

(14) A tool system according to an embodiment of the present disclosure includes: a cutting tool including a sensor and a communication unit; and a processing device installed outside the cutting tool, wherein the cutting tool transmits, to the processing device, measurement information which relates to a measurement result of the sensor and includes a serial number corresponding to the measurement result after a timing of a start of cutting by the cutting edge, and the processing device processes the measurement information received from the cutting tool.

With this configuration of transmitting measurement information from the cutting tool to the processing device, the state of the cutting edge can be determined in the processing device based on, for example, the information, such as machining conditions, owned by a machine tool with the cutting tool attached, and the measurement information from the cutting tool. Thus, the state of the cutting edge can be determined more accurately, as compared to the configuration in which the state of the cutting edge is determined based on the measurement information only. In addition, with the configuration of transmitting, to the processing device from the cutting tool, measurement information including serial numbers corresponding to measurement results, for example, in the configuration of wirelessly transmitting the measurement information to the processing device, even when reception order in the processing device is not linked to the measurement order due to retransmission or the like of the measurement information, it is possible to recognize the measurement order of the measurement results accurately in the processing device. In addition, due to the configuration of transmitting, from the cutting tool to the processing device, measurement information including serial numbers corresponding to the measurement results after the timing of the start of cutting by the cutting edge, the measurement results after the start of cutting machining can be easily extracted and analyzed in the processing device. Therefore, it is possible to implement an excellent function related to determination of the state of the cutting edge of the cutting tool.

(15) A cutting information transmission method according to an embodiment of the present disclosure is for a cutting tool including a cutting section having a cutting edge and a sensor provided in the cutting section, and the method includes: a step of performing cutting machining on a workpiece by the cutting section; a step of transmitting, to a processing device provided outside the cutting tool, measurement information which relates to a measurement result of the sensor at a time of the cutting machining and includes a serial number corresponding to the measurement result after a timing of a start of cutting by the cutting edge.

With this method of transmitting measurement information to the processing device, the state of the cutting edge can be determined in the processing device based on, for example, the information, such as machining conditions, owned by a machine tool with the cutting tool attached, and measurement information from the cutting tool. Thus, the state of the cutting edge can be determined more accurately, as compared to the configuration in which the state of the cutting edge is determined based on the measurement information only. In addition, by the method of transmitting, to the processing device, measurement information including serial numbers corresponding to measurement results, for example, in the configuration of wirelessly transmitting the measurement information to the processing device, even when reception order in the processing device is not linked to the measurement order due to retransmission or the like of the measurement information, it is possible to recognize the measurement order of the measurement results accurately in the processing device. In addition, by the method of transmitting, to the processing device, measurement information including serial numbers corresponding to the measurement results after the timing of the start of cutting by the cutting edge, the measurement results after the start of cutting machining can be easily extracted and analyzed in the processing device. Therefore, it is possible to implement an excellent function related to determination of the state of the cutting edge of the cutting tool.

Preferably, the communication unit transmits computational results to the processing device as the measurement information, the computational results being obtained by performing computation using one or multiple ones of the measurement results.

With this configuration, for example, computational results having a smaller data amount than the measurement results can be transmitted to the processing device as the measurement information, thus, particularly, in the configuration of wirelessly transmitting the measurement information to the processing device, increase in the traffic can be prevented, and interference or the like can be reduced.

Preferably, the communication unit transmits the measurement information including type information indicating the type of the sensor to the processing device.

With this configuration, for example, in a cutting tool including multiple types of sensors to measure different physical quantities, the measurement information indicating the measurement results of the various sensors can be easily distinguished and transmitted to the processing device.

Preferably, the communication unit transmits the measurement information including identification information of the cutting tool to the processing device.

With this configuration, in a system using a plurality of cutting tools concurrently, the measurement information from each of the cutting tools can be easily distinguished and processed, thus, for example, the measurement information from a cutting tool used for cutting machining and the measurement information from a cutting tool not used for cutting can be distinguished and processed.

Hereinafter, embodiments of the present disclosure will be described with reference to the drawings. In the drawings, the same or corresponding parts are denoted by the same reference numerals, and the description thereof will not be repeated. At least parts of the embodiments described below may be combined in any manner.

[Tool System]

FIG. 1 is a diagram illustrating a configuration of a tool system according to an embodiment of the present disclosure.

Referring to FIG. 1, a tool system 300 includes a cutting tool 100, a processing device 200, and a wireless base unit 201. The wireless base unit 201 is connected to the processing device 200, for example, in a wired manner. The wireless base unit 201 is, for example, an access point.

The cutting tool 100 is attached to a machine tool which is not illustrated. The cutting tool 100 includes a sensor module 20. As described below, the sensor module 20 includes a sensor.

For example, the processing device 200 can communicate with a machine tool via a wireless transmission path or a wired transmission path. Note that the processing device 200 may be part of the machine tool.

Note that the tool system 300 is not limited to the configuration including a single cutting tool 100, and may have a configuration including a plurality of cutting tools 100. Also, the tool system 300 is not limited to the configuration including a single processing device 200, and may have a configuration including a plurality of processing devices 200.

The cutting tool 100 transmits, to the processing device 200, measurement information which relates to measurement results of the sensor in the sensor module 20.

More specifically, the cutting tool 100 wirelessly transmits, to the wireless base unit 201, a radio signal including a sensor packet storing the measurement information.

The wireless base unit 201 obtains the sensor packet included in the radio signal received from the cutting tool 100, and relays the sensor packet to the processing device 200.

Upon receiving the sensor packet from the cutting tool 100 through the wireless base unit 201, the processing device 200 acquires measurement information from the received sensor packet, and processes the acquired measurement information.

The cutting tool 100 and the wireless base unit 201 perform wireless communication using a communication protocol such as, for example, ZigBee conforming to IEEE 802.15. 4, Bluetooth (registered trademark) conforming to IEEE 802.15.1, or an ultra wide band (UWB) conforming to IEEE 802.15.3a. A communication protocol other than the foregoing protocols may be used between the cutting tool 100 and the wireless base unit 201.

FIG. 2 is a chart illustrating an example of a sensor packet transmitted by a cutting tool according to the embodiment of the present disclosure.

Referring to FIG. 2, the sensor module 20 in the cutting tool 100 creates a sensor packet 401 in which measurement information is stored in a "sensor data" field.

Here, in a "synchronization header" field in the sensor packet 401, for example, a predetermined preamble is stored. In a "media access control (MAC) header" field, for example, a MAC address or the like of the sensor module 20 is stored. The "sensor data" field has a data length of 20 octets in FIG. 2. However, the data length can be changed in accordance with the type of physical quantity included in measurement information, the number of physical quantities, and so forth.

[Specific Example of Cutting Tool]

FIG. 3 is a diagram illustrating an example of the configuration of the cutting tool according to the embodiment of the present disclosure.

Referring to FIG. 3, a turning tool 100A, which is an example of the cutting tool 100, is a tool for turning machining used to machine a rotating workpiece, and is to be attached to a machine tool such as a lathe. The turning tool 100A includes a cutting section 10A, and the sensor module 20 provided in the cutting section 10A.

For example, a cutting insert 1 having a cutting edge is attachable to the cutting section 10A. Specifically, the cutting section 10A is a shank holding the cutting insert 1. In other words, the turning tool 100A is a so-called throw-away turning tool.

More specifically, the cutting section 10A includes fixing members 3A, 3B. The fixing members 3A, 3B hold the cutting insert 1.

The cutting insert 1 is, for example, polygonal, such as triangular, square, rhombic, or pentagonal, as viewed from the top. For example, the cutting insert 1 has a through hole at the center of a top surface, and is fixed to the cutting section 10A by the fixing members 3A, 3B.

FIG. 4 is a diagram illustrating another example of the configuration of the cutting tool according to the embodiment of the present disclosure.

Referring to FIG. 4, a turning tool 100B, which is an example of the cutting tool 100, is a tool for turning, machining and is to be attached to a machine tool such as a lathe. The turning tool 100B includes a cutting section 10B, and the sensor module 20 provided in the cutting section 10B.

For example, the cutting section 10B has a cutting edge 5. In other words, the turning tool 100B is a solid shank tool or a brazed tool.

Figure 5:
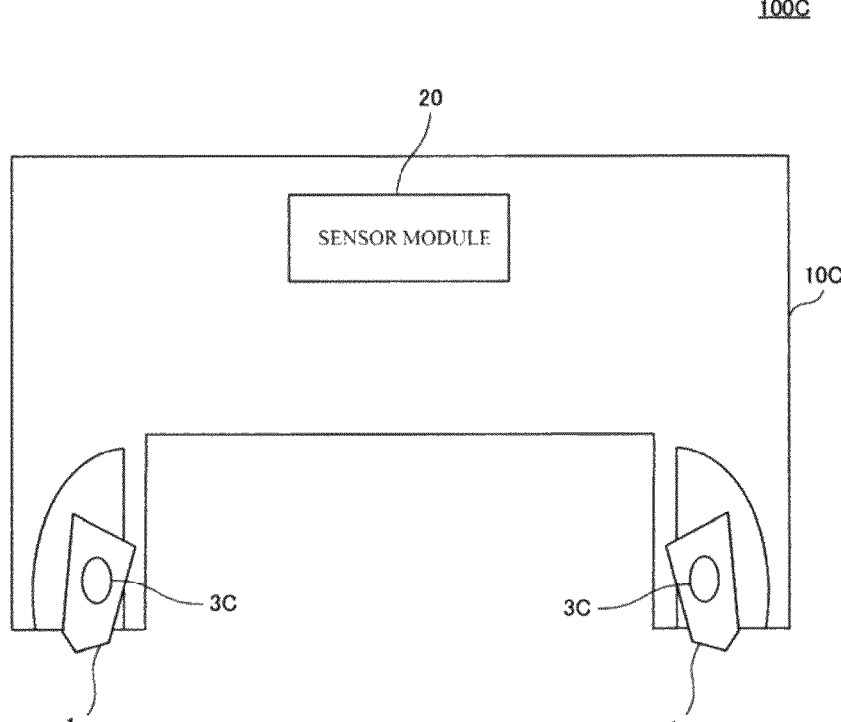
FIG. 5 is a diagram illustrating another example of the configuration of the cutting tool according to an embodiment of the present disclosure.

FIG. 5 is a diagram illustrating another example of the configuration of the cutting tool according to the embodiment of the present disclosure. FIG. 5 illustrates a cross-sectional view of the cutting tool.

Referring to FIG. 5, a rotating tool 100C, which is an example of the cutting tool 100, is a tool for rotational machining used to machine a fixed workpiece, and is to be attached to a machine tool such as a milling machine. The rotating tool 100C includes a cutting section 10C, and the sensor module 20 provided in the cutting section 10C.

For example, the cutting insert 1 having a cutting edge is attachable to the cutting section 10C. Specifically, the cutting section 10C is a holder holding the cutting insert 1. In other words, the turning tool 100C is a so-called fraise.

More specifically, the cutting section 10C includes a plurality of fixing members 3C. The fixing members 3C hold the cutting insert 1.

The cutting insert 1 is fixed to the cutting section 10C by the fixing members 3C.

Figure 6:
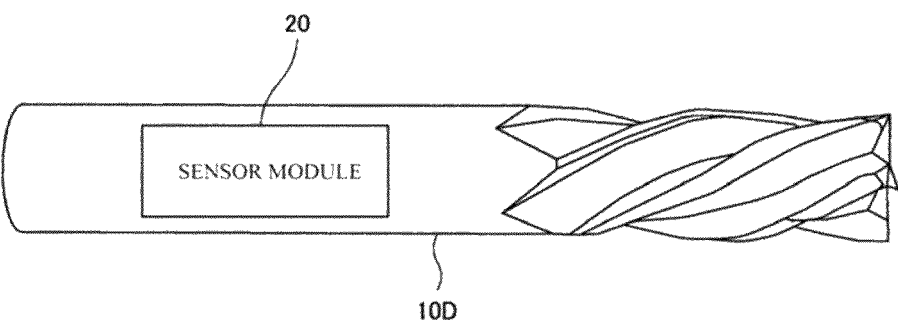
FIG. 6 is a diagram illustrating another example of the configuration of the cutting tool according to an embodiment of the present disclosure.

FIG. 6 is a diagram illustrating another example of the configuration of the cutting tool according to the embodiment of the present disclosure.

Referring to FIG. 6, a rotating tool 100D, which is an example of the cutting tool 100, is a tool for rotational machining, and is to be attached to a machine tool such as a milling machine. The rotating tool 100D includes a cutting section 10D, and the sensor module 20 provided in the cutting section 10D.

For example, the cutting section 10D has a cutting edge 5. In other words, the rotating tool 100D is an end mill.

[Sensor Module]

Figure 7:
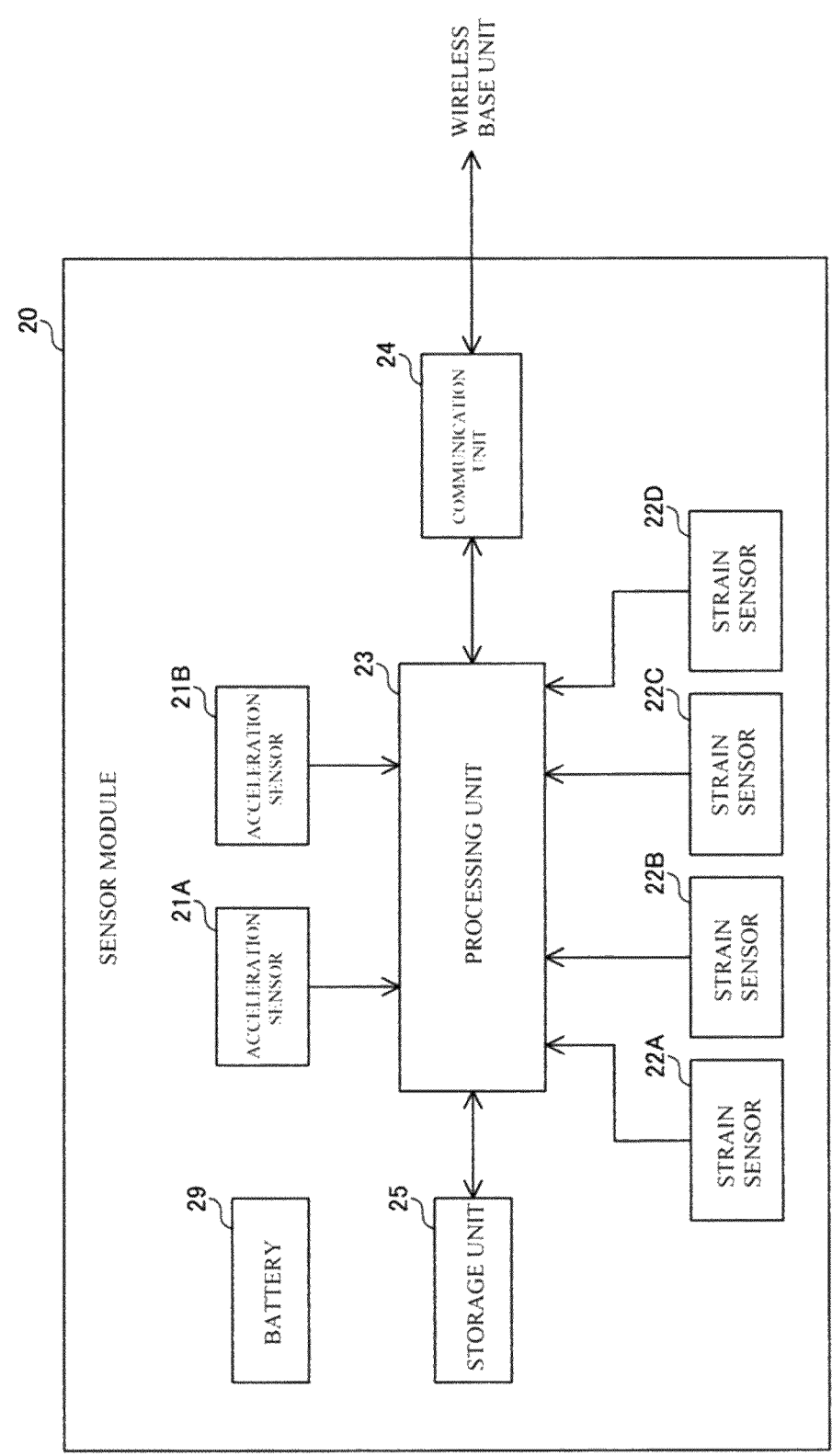
FIG. 7 is a diagram illustrating a configuration of a sensor module according to an embodiment of the present disclosure.

FIG. 7 is a diagram illustrating a configuration of a sensor module according to the embodiment of the present disclosure.

Referring to FIG. 7, the sensor module 20 includes acceleration sensors 21A, 21B, strain sensors 22A, 22B, 22C, 22D, a processing unit 23, a communication unit 24, a storage unit 25, and a battery 29. The processing unit 23 and the communication unit 24 in the sensor module 20 are started up, for example, by an operation of a user.

The processing unit 23 is implemented by processors such as a central processing unit (CPU) and a digital signal processor (DSP), for example. The communication unit 24 is implemented by a communication circuit such as an integrated circuit (IC) for communication, for example. The storage unit 25 is, for example, a non-volatile memory.

The battery 29 is, for example, a primary battery, a secondary battery, a solar battery, or an electric storage device including a capacitor or the like. The battery 29 supplies electric power to the acceleration sensors 21A, 21B, the strain sensors 22A, 22B, 22C, 22D, and the circuits of the processing unit 23 and the communication unit 24.

The acceleration sensors 21A, 21B and the strain sensors 22A, 22B, 22C, 22D are provided, for example, in the vicinity of the cutting edge of the cutting tool 100. Hereinafter, each of the acceleration sensors 21A, 21B is also referred to as an acceleration sensor 21, and each of the strain sensors 22A, 22B, 22C, 22D is also referred to as a strain sensor 22. The acceleration sensors 21 and the strain sensor 22 are an example of a sensor. The sensors are driven by the electric power supplied from the battery 29.

The sensor module 20 is not limited to the configuration including two acceleration sensors 21, and may have a configuration including one or three or more acceleration sensors 21. The sensor module 20 is not limited to the configuration including four strain sensors 22, and may have a configuration including three or less or five or more strain sensors 22. Instead of at least one of the acceleration sensor 21 and the strain sensor 22, or in addition to the acceleration sensor 21 and the strain sensor 22, the sensor module 20 may have a configuration including other sensors, such as a pressure sensor, a sound sensor and a temperature sensor.

[Communication Connection]

When being started up by an operation of a user, the processing unit 23 performs connection processing of establishing a communication connection with the processing device 200.

For example, the processing device 200 broadcasts an advertising packet including the MAC address of itself through the wireless base unit 201 on a regular or irregular basis.

After being started up by an operation of a user, the communication unit 24 acquires the advertising packet included in a radio signal received from the wireless base unit 201, and outputs the acquired advertising packet to the processing unit 23.

Upon receiving the advertising packet from the communication unit 24, the processing unit 23 performs connection processing, that is, sets the processing device 200 having the transmission source MAC address included in the received advertising packet as a communication target. Specifically, the processing unit 23 registers the transmission source MAC address in the storage unit 25 as the MAC address of the processing device 200 which is the communication target.

In addition, the processing unit 23 generates a reply packet including the MAC address of the sensor module 20 itself as connection processing, and outputs the reply packet to the communication unit 24.

The communication unit 24 transmits, to the wireless base unit 201, a radio signal including the reply packet received from the processing unit 23.

Upon receiving the reply packet from the sensor module 20 of the cutting tool 100 through the wireless base unit 201, the processing device 200 sets the sensor module 20 having the transmission source MAC address included in the received reply packet as a communication target. Specifically, the processing device 200 registers the transmission source MAC address in the storage unit of itself as the MAC address of the sensor module 20 which is the communication target.

For example, upon registering the transmission source MAC address in the storage unit 25 as the MAC address of the processing device 200 which is the communication target, the processing unit 23 performs a process of starting up the acceleration sensor 21 and the strain sensor 22.

[Transmission of Sensor Packet]

The acceleration sensor 21 measures an acceleration, and outputs an analog signal indicating the measured acceleration to the processing unit 23. The strain sensor 22 measures strain, and outputs an analog signal indicating the measured strain to the processing unit 23.

The processing unit 23 generates measurement information which relates to the measurement results of the sensors.

For example, the processing unit 23 generates measurement information including a measured value of the acceleration sensor 21 and a measured value of the strain sensor 22.

Specifically, the processing unit 23 performs analog digital (AD) conversion on the analog signals received from the acceleration sensor 21 and the strain sensor 22 at a sampling timing in accordance with a generation period Ta which is a predetermined period, and generates sensor measured values which are the digital values after the conversion. Let F [Hz] be the sampling frequency of the processing device 23, then the generation period Ta is 1/F.

The processing unit 23 then generates a sensor packet storing the measurement information including the sensor measured values, and outputs the generated sensor packet to the communication unit 24.

The communication unit 24 transmits the measurement information received from the processing unit 23 to the processing device 200 provided outside the cutting tool 100. More specifically, the communication unit 24 transmits, to the processing device 200 through the wireless base unit 201, the sensor packet storing the measurement information, received from the processing unit 23.

For example, for each generation period Ta of measurement result, the communication unit 24 transmits measurement information including corresponding one measurement result to the processing device 200.

More specifically, the processing unit 23 generates a sensor packet storing measurement information including one corresponding sensor measured value at each sampling timing, and outputs the generated sensor packet to the communication unit 24. In other words, the processing unit 23 outputs the sensor packet to the communication unit 24 at the transmission timing which is the same timing as the sampling timing.

The communication unit 24 receives a sensor packet from the processing unit 23 at each transmission timing, and transmits the received sensor packet to the processing device 200 through the wireless base unit 201.

The communication unit 24 is not limited to the configuration of transmitting, to the processing device 200, measurement information including one measurement result for each generation period Ta.

For example, the communication unit 24 may be configured to transmit, to the processing device 200 for every period of an integral multiple of the generation period Ta, measurement information including corresponding one or multiple ones of the measurement results.

More specifically, upon generating a sensor measured value at a sampling timing in accordance with the generation period Ta, the processing unit 23 accumulates the generated sensor measured value in the storage unit 25. The processing unit 23 acquires part or whole of the sensor measured values from the storage unit 25 at a transmission timing in accordance with period Tb which is, for example, five times the generation period Ta, and generates measurement information including the acquired part or whole of the sensor measured values. In addition, the processing unit 23 deletes the sensor measured values in the storage unit 25.

The processing unit 23 then generates a sensor packet storing the measurement information including the acquired sensor measured values, and outputs the generated sensor packet to the communication unit 24.

The communication unit 24 receives a sensor packet from the processing device 23 at each transmission timing, and transmits the received sensor packet to the processing device 200 through the wireless base unit 201.

For example, the communication unit 24 may be configured to transmit, to the processing device 200, measurement information including a plurality of measurement results at different measurement timings.

More specifically, upon generating a sensor measured value at a sampling timing in accordance with the generation period Ta, the processing unit 23 accumulates the generated sensor measured value in the storage unit 25. When the number of sensor measured values accumulated in the storage unit 25 reaches 10, for example, the processing unit 23 acquires from the storage unit 25, the 10 sensor measured values which are the measurement results at different measurement timings, and generates measurement information including the acquired 10 sensor measured values. In other words, the processing unit 23 generates measurement information at a transmission timing in accordance with period Tc which is 10 times the generation period Ta. In addition, the processing unit 23 deletes the 10 sensor measured values from the storage unit 25.

The processing unit 23 then generates a sensor packet storing measurement information including the 10 sensor measured values, and outputs the generated sensor packet to the communication unit 24.

Upon receiving a sensor packet from the processing unit 23 at each transmission timing, the communication unit 24 transmits the received sensor packet to the processing device 200 through the wireless base unit 201.

Specific Example 1 of Measurement Information

The communication unit 24 may be configured to transmit measurement information including the identification information of the cutting tool 100 to the processing device 200.

More specifically, the storage unit 25 stores a tool ID which is identification information of the cutting tool 100.

The processing unit 23 generates measurement information including the tool ID.

The processing unit 23 then generates a sensor packet storing the measurement information including the tool ID, and outputs the generated sensor packet to the communication unit 24.

Specific Example 2 of Measurement Information

The communication unit 24 may be configured to transmit, to the processing device 200, voltage information indicating the voltage of the battery 29.

More specifically, upon generating measurement information, the processing unit 23 checks the voltage of the battery 29, and generates voltage information indicating the voltage of the current battery 29. The processing unit 23 then generates a sensor packet storing the generated measurement information and voltage information, and outputs the generated sensor packet to the communication unit 24.

Specific Example 3 of Measurement Information

The communication unit 24 may be configured to transmit computational results to the processing device 200 as the measurement information, the computational results being obtained by performing computation using one or multiple measurement results.

More specifically, the processing unit 23 performs computation using one or multiple sensor measured values. For example, the processing unit 23 computes the average value, the maximum and the minimum of the multiple sensor measured values, and generates measurement information indicating the computational results.

The processing unit 23 then generates a sensor packet storing the measurement information indicating the computational results, instead of the sensor measured values themselves, and outputs the generated sensor packet to the communication unit 24.

Specific Example 4 of Measurement Information

The communication unit 24 may be configured to transmit, to the processing device 200, measurement information including type information indicating the type of a sensor.

More specifically, the storage unit 25 stores type IDs indicating type information of the sensors in the sensor module 20.

The processing unit 23 generates measurement information including type IDs. More specifically, the processing unit 23 generates measurement information including type IDs and the sensor measured values of the sensors corresponding to the type IDs.

FIG. 8 is a chart illustrating an example of measurement information generated by the processing unit according to the embodiment of the present disclosure.

Referring to FIG. 8, the processing unit 23 generates measurement information including "1" which is the type ID of the strain sensor 22, a sensor measured value of the strain sensor 22, "2" which is the type ID of the acceleration sensor 21, and a sensor measured value of the acceleration sensor 21. FIG. 8 illustrates measurement information including six sensor measured values of the strain sensor 22 and six sensor measured values of the acceleration sensor 21 at six different measurement timings.

The processing unit 23 generates a sensor packet storing measurement information including type IDs, and outputs the generated sensor packet to the communication unit 24.

Specific Example 5 of Measurement Information

The communication unit 24 may be configured to transmit, to the processing device 200, measurement information including the identification information of the sensors in the sensor module 20.

More specifically, the storage unit 25 stores sensor IDs indicating the identification information of the sensors.

The processing unit 23 generates measurement information including sensor IDs. More specifically, the processing unit 23 generates measurement information including sensor IDs and the sensor measured values of the sensors corresponding to the sensor IDs.

FIG. 9 is a chart illustrating an example of measurement information generated by the processing unit according to the embodiment of the present disclosure.

Referring to FIG. 9, the processing unit 23 generates measurement information including "1" which is the sensor ID of the strain sensor 22A, a sensor measured value of the strain sensor 22A, "2" which is the sensor ID of the strain sensor 22B, a sensor measured value of the strain sensor 22B, "3" which is the sensor ID of the strain sensor 22C, a sensor measured value of the strain sensor 22C, "4" which is the sensor ID of the strain sensor 22D, and a sensor measured value of the strain sensor 22D. FIG. 9 illustrates measurement information including 24 sensor measured values of the strain sensor 22 at six different measurement timings.

The processing unit 23 generates a sensor packet storing measurement information including sensor IDs, and outputs the generated sensor packet to the communication unit 24.

The processing unit 23 may be configured to generate measurement information including sensor IDs and type IDs. More specifically, the processing unit 23 generates measurement information including sensor IDs and type IDs, and the sensor measured values of the sensors indicated by the sensor IDs and the type IDs.

FIG. 10 is a chart illustrating an example of measurement information generated by the processing unit according to the embodiment of the present disclosure.

Referring to FIG. 10, the processing unit 23 generates measurement information including "1" which is the type ID of the strain sensor 22, "1" which is the type ID of the strain sensor 22A, a sensor measured value of the strain sensor 22A, "1" which is the type ID of the strain sensor 22, "2" which is the sensor ID of the strain sensor 22B, a sensor measured value of the strain sensor 22B, "2" which is the type ID of the acceleration sensor 21, "1" which is the sensor ID of the acceleration sensor 21A, a sensor measured value of the strain sensor 21A, "2" which is the type ID of the acceleration sensor 21, "2" which is the sensor ID of the acceleration sensor 21B, and a sensor measured value of the acceleration sensor 21B. FIG. 10 illustrates measurement information including 12 sensor measured values of the strain sensor 22 and 12 sensor measured values of the acceleration sensor 21 at six different measurement timings.

The processing unit 23 generates a sensor packet storing measurement information including sensor IDs and type IDs, and outputs the generated sensor packet to the communication unit 24.

Specific Example 6 of Measurement Information

The communication unit 24 may be configured to transmit, to the processing device 200, measurement information including a measurement time corresponding to a measurement result.

For example, the processing unit 23 generates measurement information including a generation time which is a relative time with respect to the time when the sensor measured value started to be generated. The generation time is an example of a measurement time.

FIG. 11 is a chart illustrating an example of measurement information generated by the processing unit according to the embodiment of the present disclosure.

Referring to FIG. 11, the processing unit 23 generates measurement information which includes sensor measured values of the strain sensor 22, and the generation times of the sensor measured values. FIG. 11 illustrates measurement information including six sensor measured values of the strain sensor 22 at six different measurement timings.

The processing unit 23 generates a sensor packet storing measurement information including the generation times, and outputs the generated sensor packet to the communication unit 24.

Specific Example 7 of Measurement Information

The communication unit 24 may be configured to transmit, to the processing device 200, measurement information including a serial number corresponding to a measurement result.

For example, the processing unit 23 generates measurement information including sequence numbers which are serial numbers of the sensor measured values.

FIG. 12 is a chart illustrating an example of measurement information generated by the processing unit according to the embodiment of the present disclosure.

Referring to FIG. 12, the processing unit 23 generates measurement information which includes sensor measured values of the strain sensor 22, and sequence numbers of the sensor measured values. FIG. 12 illustrates measurement information including six sensor measured values of the strain sensor 22 at six different measurement timings.

The processing unit 23 then generates a sensor packet storing measurement information including the sequence numbers, and outputs the generated sensor packet to the communication unit 24.

The processing unit 23 may be configured to output a sensor packet to the communication unit 24, the sensor packet including any two or more of tool ID, voltage information, type ID, sensor ID, generation time and sequence number.

Another Example 1 of Transmission Timing

Figure 13:
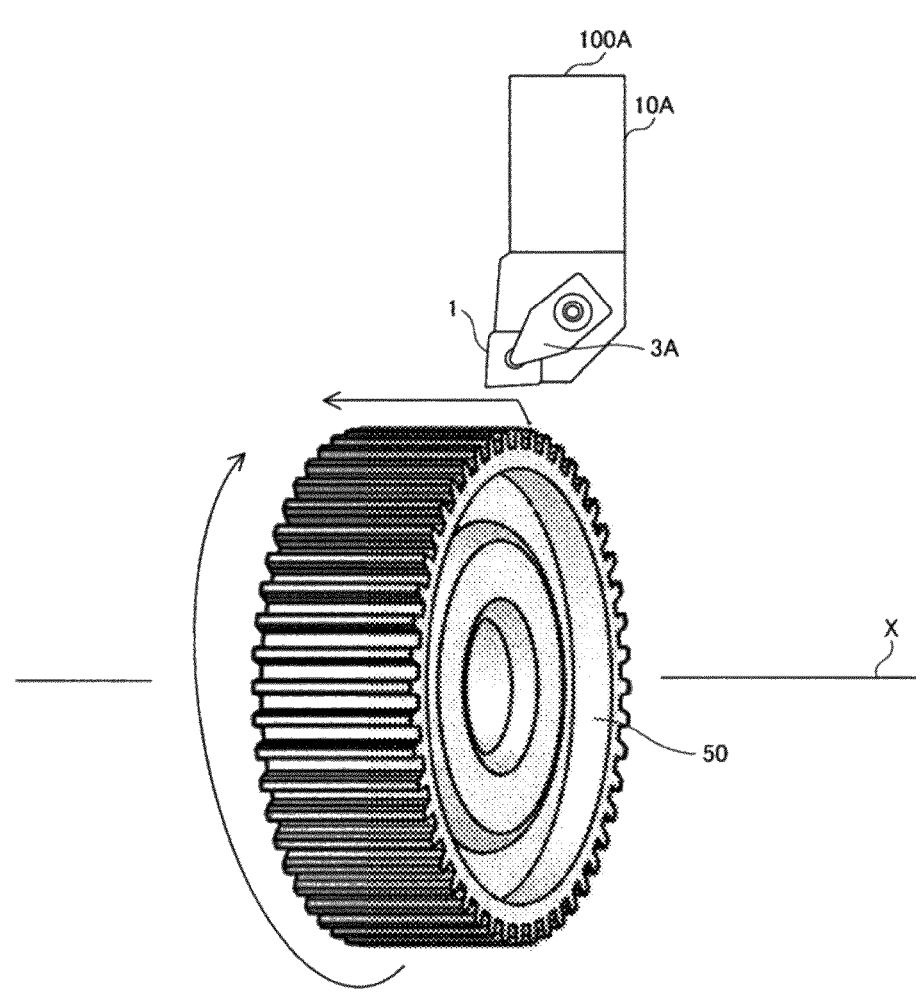
FIG. 13 is a diagram illustrating an example of a workpiece which undergoes cutting machining using the cutting tool according to an embodiment of the present disclosure.

FIG. 13 is a diagram illustrating an example of a workpiece which undergoes cutting machining using the cutting tool according to the embodiment of the present disclosure. FIG. 13 illustrates the manner in which turning machining is performed using the turning tool 100A on a gear member 50 which is a workpiece. Multiple projections, that is, convex portions are formed on the outer circumference of the gear member 50. The gear member 50 includes convex portions and concave portions alternately arranged in the outer circumferential direction.

Referring to FIG. 13, a machine tool with the turning tool 100A attached performs cutting machining on the gear member 50 by bringing the machine tool into contact with the convex portions of the gear member 50 while moving the cutting insert 1 of the turning tool 100A in a direction parallel to the rotational axis X with the gear member 50 rotating around the rotational axis X.

For example, the communication unit 24 may be configured to transmit measurement information to the processing device 200 at a transmission timing in accordance with the number of revolutions of the gear member 50 which is a workpiece. More specifically, the communication unit 24 transmits measurement information to the processing device 200 at a transmission timing when the gear member 50 is rotating and the cutting edge is not in contact with the gear member 50. In other words, between a contact period in which the cutting edge is in contact with the gear member 50 and a non-contact period in which the cutting edge is not in contact with the gear member 50 during turning machining, the communication unit 24 transmits the measurement information to the processing device 200 selectively in the non-contact period.

More specifically, when establishing a communication connection with the processing device 200, the processing unit 23 acquires machining information indicating the machining conditions of the machine tool from the processing device 200. For example, the processing unit 23 transmits a machining information request to the processing device 200 through the communication unit 24 and the wireless base unit 201.

Upon receiving a machining information request from the processing unit 23 in the sensor module 20 of the turning tool 100A, as a response to the machining information request, the processing device 200 transmits machining information to the sensor module 20 through the wireless base unit 201. For example, the machining information includes the number N1 of convex portions in the gear member 50, ratio P [%] of the length of the convex portions to the sum of the length of the convex portions and the length of the concave portions of the gear member 50 in the outer circumferential direction, and the number of revolutions R1 [rpm] of the gear member 50.

Upon receiving the machining information from the processing device 200 through the wireless base unit 201, the communication unit 24 in the sensor module 20 outputs the received machining information to the processing unit 23.

Upon receiving the machining information from the processing device 200 through the wireless base unit 201 and the communication unit 24, the processing unit 23 calculates period T1 of contact of the cutting edge of the cutting insert 1 with a convex portion of the gear member 50 based on the received machining information according to Expression (1) below. The period T1 refers to the time since the cutting edge of the cutting insert 1 comes into contact with a convex portion until the cutting edge comes into contact with another convex portion adjacent to the convex portion.

[Expression 1]

$$T1 = (60/R1)/N1 \tag{1}$$

The processing unit 23 sets standby time T2 to a value in the range defined by Inequality (2) below based on the received machining information, the standby time T2 being from the initial timing of detection of increase or decrease of the sensor measured value after start-up of the sensor in the sensor module 20 to transmission of a sensor packet to the processing device 200.

[Expression 2]

$$T1 \times (P/100) < T2 < T1 \qquad (2)$$

The processing unit 23 stores the calculated period T1 and the set standby time T2 in the storage unit 25.

The processing unit 23 may be configured to receive machining information including the period T1 and the standby time T2 from the processing device 200 through the wireless base unit 201 and the communication unit 24, and to acquire the period T1 and the standby time T2 from the received machining information to store them in the storage unit 25.

Figure 14:
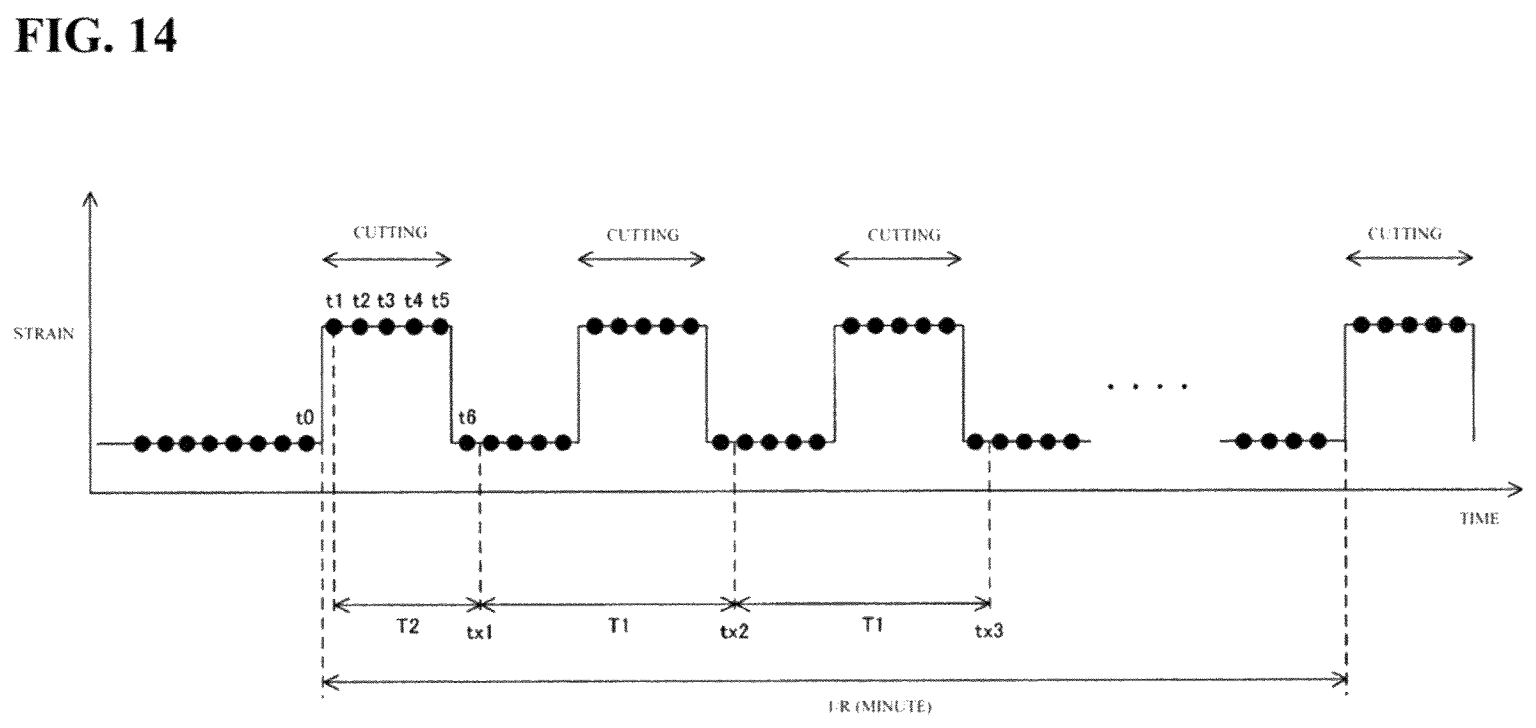

FIG. 14 is a chart illustrating temporal variations of strain measured by a strain sensor in the sensor module according to the embodiment of the present disclosure. In FIG. 14, the solid line indicates the strain measured by the strain sensor 22, and the plots on the solid line indicate the sensor measured values generated by the processing unit 23 based on the analog signal from the strain sensor 22.

Referring to FIG. 14, the strain measured by the strain sensor 22 has a high value, for example when the cutting edge of the cutting insert 1 is in contact with a convex portion of the gear member 50, and has a low value when the cutting edge of the cutting insert 1 is not in contact with any convex portion of the gear member 50.

When the difference between the sensor measured value generated at time t1 and the sensor measured value gener-ated at time to that is a sampling timing immediately before time t1 is greater than a predetermined threshold Th, the processing unit 23 determines that the sensor measured value has increased at time t1.

At time tx1 after elapse of the standby time T2 from time t1, the processing unit 23 outputs a sensor packet storing measurement information including sensor measured values to the communication unit 24. More specifically, the pro-cessing unit 23 does not output any sensor packet to the communication unit 24 in the period from time t1 to the time immediately before time tx1, and outputs a sensor packet to the communication unit 24 at time tx1.

Specifically, for example, when determining that the sensor measured value has increased at time t1, the process-ing unit 23 accumulates the sensor measured values in the storage unit 25, which are generated at times t1, t2, t3, t4, t5, t6 between time t1 and time tx1. The processing unit 23 then outputs a sensor packet to the communication unit 24 at time tx1, the sensor packet storing measurement information including the sensor measured values generated at times t1, t2, t3, t4, t5, t6.

After time tx1, the processing unit 23 outputs a sensor packet to the communication unit 24 at times tx2, tx3 which are transmission timings in accordance with the period T1, the sensor packet storing measurement information includ-ing multiple sensor measured values.

Specifically, the processing unit 23 outputs a sensor packet to the communication unit 24 at time tx2, the sensor packet storing measurement information including the mul-tiple sensor measured values generated between time tx1 and time tx2. In addition, the processing unit 23 outputs a sensor packet to the communication unit 24 at time tx3, the sensor packet storing measurement information including the multiple sensor measured values generated between time tx2 and time tx3.

Upon receiving a sensor packet from the processing unit 23 at time tx1, tx2, tx3, the communication unit 24 transmits the received sensor packet to the processing device 200 through the wireless base unit 201. In this manner, the communication unit 24 transmits measurement information to the processing device 200 at a timing in accordance with the period T1 based on the number of revolutions R1 of the gear member 50 and the number N1 of convex portions.

The processing unit 23 may be configured to output a sensor packet to the communication unit 24 at a timing when a predetermined number of sensor measured values are generated since the sensor measured value has increased.

Specifically, the processing unit 23 sets a cumulative number S1 to a value in the range defined by Inequality (3) below based on the received machining information, the cumulative number S1 being the number of sensor measured values to be accumulated in the storage unit 25 during the time since the initial detection of increase of the sensor measured value after start-up of the sensor in the sensor module 20 until a sensor packet is transmitted to the pro-cessing device 200.

[Expression 3]

$$T1 \times (P/100) \times F < S1 < T1 \times F \qquad (3)$$

For example, the processing unit 23 sets the cumulative number S1 to five based on the ratio P [%] indicated by the machining information, the sampling frequency F of itself and Inequality (3).

When determining that the sensor measured value has increased at time t1, the processing unit 23 accumulates the sensor measured values in the storage unit 25 at the sample timings from time t1 to time t5, and upon the cumulative number of the sensor measured values in the storage unit 25 reaching five, the processing unit 23 outputs, to the com-munication unit 24, a sensor packet storing measurement information including the five sensor measured values.

After time t5, the processing unit 23 outputs a sensor packet to the communication unit 24 at a timing in accor-dance with the period T1, the sensor packet storing mea-surement information including the most recent five sensor measured values.

Upon receiving the sensor packet from the processing unit 23, the communication unit 24 transmits the received sensor packet to the processing device 200 through the wireless base unit 201.

Another Example 2 of Transmission Timing

Figure 15:
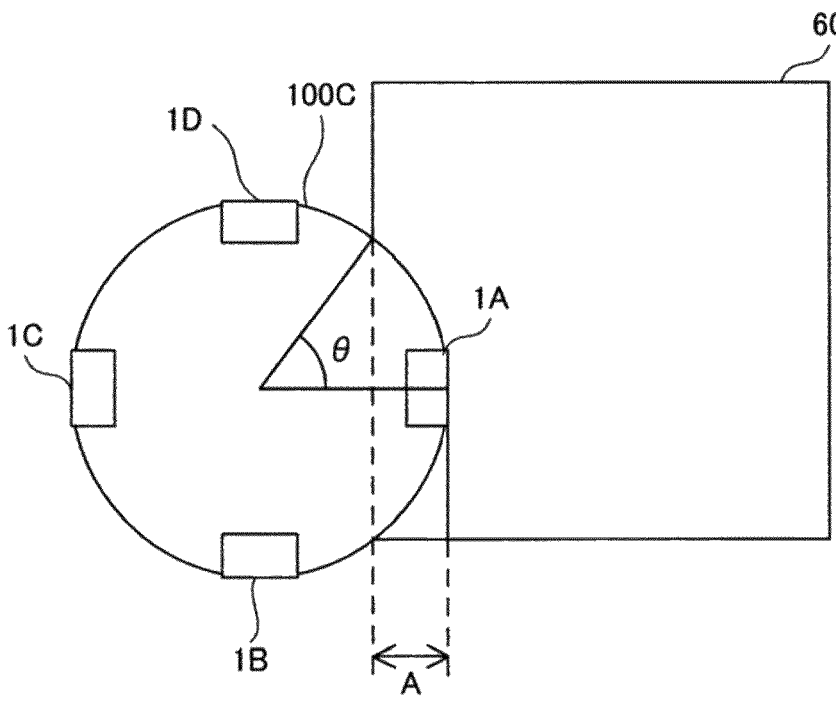
FIG. 15 is a diagram illustrating an example of a workpiece which undergoes cutting machining using the cutting tool according to an embodiment of the present disclosure.

FIG. 15 is a diagram illustrating an example of a work-piece which undergoes cutting machining using the cutting tool according to the embodiment of the present disclosure. FIG. 15 illustrates the manner in which rotational machining is performed on a steel material 60 which is a workpiece using the turning tool 100C with four cutting inserts 1A, 1B, 1C, 1D attached as the cutting insert 1. The shape of the steel material 60 is, for example, square.

Referring to FIG. 15, a machine tool with the turning tool 100C attached performs cutting machining on the steel material 60 by bringing the cutting insert 1 of the turning tool 100C into contact with the fixed steel material 60 with the turning tool 100C rotating.

For example, the communication unit 24 may be config-ured to transmit measurement information to the processing device 200 at a transmission timing in accordance with the number of revolutions of the turning tool 100C. More specifically, the communication unit 24 transmits measurement information to the processing device 200 at a transmission timing when the turning tool 100C is rotating and the cutting edge is not in contact with the steel material 60. In other words, between a contact period in which the cutting edge is in contact with the steel material 60 and a non-contact period in which the cutting edge is not in contact with the steel material 60 during rotational machining, the communication unit 24 transmits the measurement information to the processing device 200 selectively in the non-contact period.

More specifically, when establishing a communication connection with the processing device 200, the processing unit 23 acquires machining information indicating the machining conditions of the machine tool. For example, the processing unit 23 transmits a machining information request to the processing device 200 through the communication unit 24 and the wireless base unit 201.

Upon receiving the machining information request from the processing unit 23 in the sensor module 20 of the turning tool 100C, as a response to the machining information request, the processing device 200 transmits machining information to the sensor module 20 through the wireless base unit 201. For example, the machining information includes the number N2 of cutting inserts 1 attached to the turning tool 100C, diameter D [mm] of the turning tool 100C, nominal depth of cut A [mm] which is a cutting width of the steel material 60, and the number of revolutions R2 [rpm] of the turning tool 100C.

Upon receiving the machining information from the processing device 200 through the wireless base unit 201, the communication unit 24 in the sensor module 20 outputs the received machining information to the processing unit 23.

Upon receiving the machining information from the processing device 200 through the wireless base unit 201 and the communication unit 24, the processing unit 23 calculates period T3 of contact of the cutting edge of the cutting insert 1 with the steel material 60 based on the received machining information according to Expression (4) below.

[Expression 4]

$$T3 = (60/R2)/N2 \qquad (4)$$

The processing unit 23 sets standby time T4 to a value in the range defined by Inequality (5) below based on the received machining information, the standby time T4 being from the initial detection of increase or decrease of the sensor measured value after start-up of the sensor in the sensor module 20 to transmission of a sensor packet to the processing device 200.

[Equation 5]

$$T3 \times \arccos(1 - 2A/D) \times 2/\pi < T4 < T3 \qquad (5)$$

The processing unit 23 stores the calculated period T3 and the set standby time T4 in the storage unit 25.

The processing unit 23 may be configured to receive machining information including the period T3 and the standby time T4 from the processing device 200 through the wireless base unit 201 and the communication unit 24, and to acquire the period T3 and the standby time T4 from the received machining information to store them in the storage unit 25.

Figure 16:
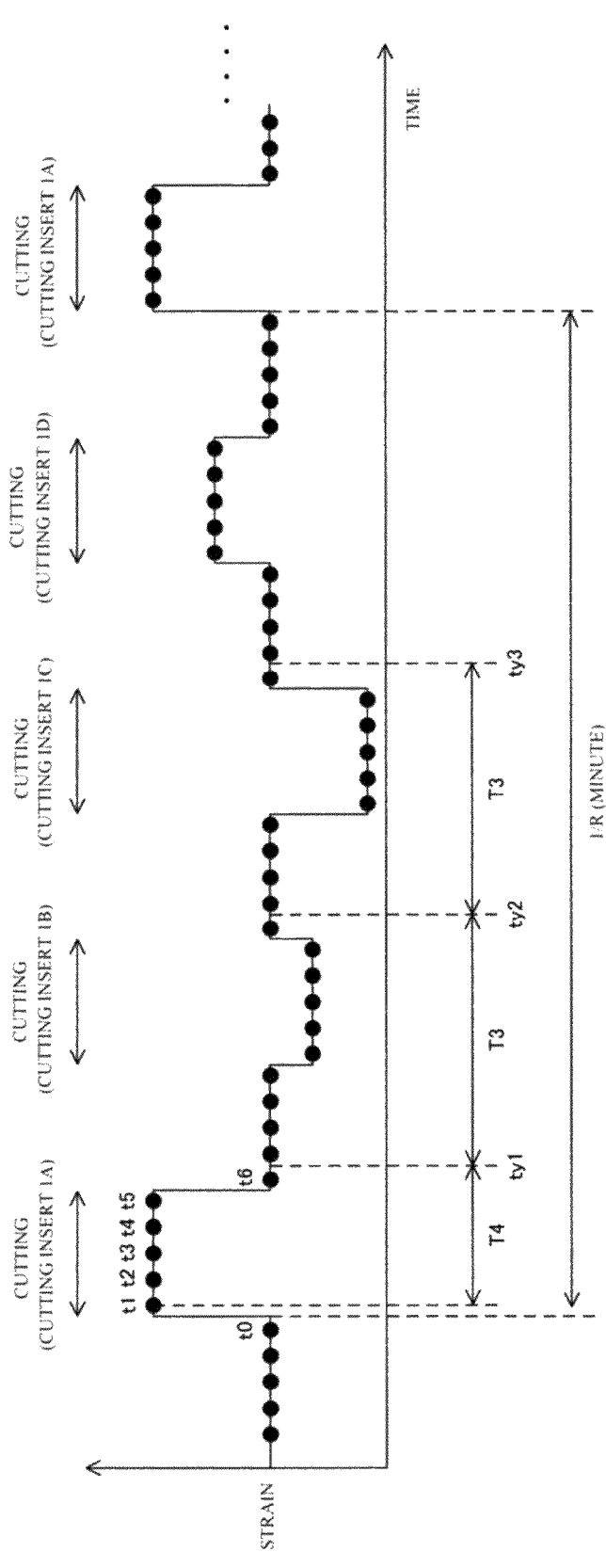
FIG. 16 is a chart illustrating temporal variations of strain measured by the strain sensor in the sensor module according to an embodiment of the present disclosure.

FIG. 16 is a chart illustrating temporal variations of strain measured by the strain sensor in the sensor module according to the embodiment of the present disclosure. In FIG. 16, the solid line indicates the strain measured by the strain sensor 22, and the plots on the solid line indicate the sensor measured values generated by the processing unit 23 based on the analog signal from the strain sensor 22.

Referring to FIG. 16, for example, relative to when the cutting edge of the cutting insert 1 is not in contact with the steel material 60, the strain measured by the strain sensor 22 has a high value when the cutting edge of cutting insert 1A is in contact with the steel material 60, has a low value when the cutting edge of cutting insert 1B is in contact with the steel material 60, has a low value when the cutting edge of cutting insert 1C is in contact with the steel material 60, and has a high value when the cutting edge of cutting insert 1D is in contact with the steel material 60.

When the difference between the sensor measured value generated at time t1 and the sensor measured value generated at time to that is a sampling timing immediately before time t1 is greater than a predetermined threshold Th, the processing unit 23 determines that the sensor measured value has increased at time t1.

At time ty1 after elapse of the standby time T4 from time t1, the processing unit 23 outputs a sensor packet storing measurement information including sensor measured values to the communication unit 24. More specifically, the processing unit 23 does not output any sensor packet to the communication unit 24 in the period from time t1 to the time immediately before time ty1, but outputs a sensor packet to the communication unit 24 at time ty1.

Specifically, for example, when determining that the sensor measured value has increased at time t1, the processing unit 23 accumulates the sensor measured values generated at times t1, t2, t3, t4, t5, t6 between time t1 and time ty1 in the storage unit 25. The processing unit 23 then outputs, to the communication unit 24 at time ty1, a sensor packet storing measurement information including the sensor measured values generated at times t1, t2, t3, t4, t5, t6.

After time ty1, the processing unit 23 outputs a sensor packet to the communication unit 24 at times ty2, ty3 which are transmission timings in accordance with the period T3, the sensor packet storing measurement information including multiple sensor measured values.

Specifically, the processing unit 23 outputs, to the communication unit 24 at time ty2, a sensor packet storing measurement information including the multiple sensor measured values generated from time ty1 to time ty2. In addition, the processing unit 23 outputs, to the communication unit 24 at time ty3, a sensor packet storing measurement information including the multiple sensor measured values generated from time ty2 to time ty3.

Upon receiving a sensor packet from the processing unit 23 at time ty1, ty2, ty3 in accordance with the period T3, the communication unit 24 transmits the received sensor packet to the processing device 200 through the wireless base unit 201. In this manner, the communication unit 24 transmits measurement information to the processing device 200 at a transmission timing in accordance with the period T3 based on the number of revolutions R2 of the turning tool 100C, and the number N2 of cutting inserts 1.

The processing unit 23 may be configured to output a sensor packet to the communication unit 24 at a timing when a predetermined number of sensor measured values are generated since the sensor measured value has increased.

Specifically, the processing unit 23 sets a cumulative number S2 to a value in the range defined by Inequality (6) below based on the received machining information, the cumulative number S2 being the number of sensor measured values to be accumulated in the storage unit 25 during the time since the initial detection of increase of the sensor measured value after start-up of the sensor in the sensor module 20 until a sensor packet is transmitted to the processing device 200.

[Expression 6]

$$T3 \times \arccos(1 - 2A/D) \times 2/\pi \times F < S2 < T3 \times F \qquad (6)$$

For example, the processing unit 23 sets the cumulative number S2 to five based on the diameter D [mm], nominal depth of cut A [mm] of the turning tool 100C, the sampling frequency F of itself and Inequality (6).

When determining that the sensor measured value has increased at time t1, the processing unit 23 accumulates the sensor measured values in the storage unit 25 at the sample timings from time t1 to time t5, and upon the cumulative number of the sensor measured values in the storage unit 25 reaching five, the processing unit 23 outputs, to the communication unit 24, a sensor packet storing measurement information including the five sensor measured values.

After time t5, the processing unit 23 outputs a sensor packet to the communication unit 24 at a transmission timing in accordance with the period T3, the sensor packet storing measurement information including the most recent five sensor measured values.

Upon receiving the sensor packet from the processing unit 23, the communication unit 24 transmits the received sensor packet to the processing device 200 through the wireless base unit 201.

Specific Example 8 of Measurement Information

The communication unit 24 may be configured to transmit, to the processing device 200, measurement information including a serial number corresponding to a measurement result after the timing of the start of cutting by the cutting edge.

For example, the processing unit 23 generates measurement information including the sequence numbers of the sensor measured values generated after the timing of the start of cutting by the cutting edge.

FIG. 17 is a chart illustrating an example of measurement information generated by the processing unit according to the embodiment of the present disclosure. Referring to FIG. 17, the processing unit 23 generates measurement information which includes sensor measured values of the strain sensor 22, and the sequence numbers of the sensor measured values, incremented at a timing after the timing of the start of cutting by the cutting edge. FIG. 17 illustrates measurement information including 10 sensor measured values of the strain sensor 22 at 10 different measurement timings.

More specifically, when the difference between the sensor measured value generated at time t1 and the sensor measured value generated at time t0 is greater than a predetermined threshold ThA, the processing unit 23 determines that cutting by the cutting edge has started, the time t1 being a sampling timing after the timing of the start of generation of sensor measured value, the time to being a sampling timing immediately before time t1. The processing unit 23 generates measurement information which includes sensor measured values, and the sequence numbers of the sensor measured values, incremented according to the order of generation of the sensor measured values after time t1.

The processing unit 23 then generates a sensor packet storing measurement information including the sequence numbers, and outputs the generated sensor packet to the communication unit 24.

The communication unit 24 may be configured to not transmit, to the processing device 200, measurement information including the sensor measured values generated before the start of cutting by the cutting edge, but to transmit, to the processing device 200, measurement information including the sensor measured values generated after the timing of the start of cutting by the cutting edge.

More specifically, the processing unit 23 does not generate measurement information until it is determined that cutting by the cutting edge has started, however, when cutting by the cutting edge is determined to have started based on the sensor measured values generated at times t0, t1 and the threshold ThA as described above, the processing unit 23 generates measurement information which includes the sensor measured values generated after time t1 and the sequence numbers. The processing unit 23 then generates a sensor packet storing the generated measurement information, and outputs the sensor packet to the communication unit 24.

Specific Example 9 of Measurement Information

The communication unit 24 may be configured to transmit, to the processing device 200, measurement information including determination information which corresponds to a measurement result and indicates whether the measurement result is for when cutting is carried out by a cutting edge.

For example, the processing unit 23 generates measurement information including cutting flags each of which indicates whether a measurement result is for when cutting is carried out by a cutting edge. The cutting flag is an example of determination information.

FIG. 18 is a chart illustrating an example of measurement information generated by the processing unit according to the embodiment of the present disclosure. Referring to FIG. 18, the processing unit 23 generates measurement information which indicates sensor measured values of the strain sensor 22, and respective cutting flags of the sensor measured values. The processing unit 23 sets the cutting flag of a sensor measured value to "1" when cutting is carried out by a cutting edge, and sets the cutting flag of a sensor measured value to "zero" when cutting is not carried out by a cutting edge. FIG. 18 illustrates measurement information including 10 sensor measured values of the strain sensor 22 at 10 different measurement timings.

More specifically, when a generated sensor measured value is greater than a predetermined threshold ThB, the processing unit 23 determines that the sensor measured value is the one when cutting is carried out by a cutting edge, and sets the cutting flag of the sensor measured value to "1". In contrast, when a generated sensor measured value is less than the predetermined threshold ThB, the processing unit 23 determines that the sensor measured value is the one when cutting is not carried out by a cutting edge, and sets the cutting flag of the sensor measured value to "zero".

The processing unit 23 then generates a sensor packet storing measurement information including cutting flags, and outputs the generated sensor packet to the communication unit 24.

Specific Example 10 of Measurement Information

The communication unit 24 may be configured to transmit, to the processing device 200, measurement information including phase information which corresponds to a measurement result, and relates to the phase of cutting machining after the timing of the start of cutting by the cutting edge.

As an example, the communication unit 24 in the turning tool 100A transmits, to the processing device 200, measurement information including, as the phase information, identification information of each convex portion in the gear member 50 which is a workpiece. More specifically, the processing unit 23 generates measurement information including a pitch number different for each convex portion, the pitch number indicating a convex portion where cutting is being carried out by the cutting edge among multiple convex portions in the gear member 50. The pitch number is an example of the identification information.

As described above, the sensor measured value generated by the processing unit 23 in the turning tool 100A has a high value when the cutting edge of the cutting insert 1 is in contact with a convex portion, that is, a tooth of the gear member 50, and has a low value when the cutting edge of the cutting insert 1 is not in contact with any convex portion of the gear member 50, in other words, the cutting edge is located at a groove of the gear member 50. In short, the sensor measured value generated by the processing unit 23 varies periodically.

For example, the turning tool 100A performs turning machining on a gear member 50A which is an example of the gear member 50. It is assumed that 36 convex portions are formed on the outer circumference of the gear member 50A. As described above, the processing unit 23 receives machining information from the processing device 200 through the wireless base unit 201 and the communication unit 24, and recognizes that the number N1 of convex portions in the gear member 50A is 36 based on the received machining information.

FIG. 19 is a chart illustrating an example of pitch numbers in the measurement information generated by the processing unit according to the embodiment of the present disclosure. Referring to FIG. 19, based on the result of comparison between two sensor measured values respectively generated at two consecutive sampling timings after the timing of the start of generation of sensor measured value, when sensor measured value Sr which has increased by an increase width greater than or equal to a predetermined value is detected, the processing unit 23 sets the pitch numbers to "1", which correspond to the sensor measured values generated after the sampling timing of the sensor measured value Sr.

Each time detecting the sensor measured value Sr, the processing unit 23 increments the pitch number corresponding to the sensor measured value generated after the sampling timing of the detected sensor measured value Sr. After incrementing the pitch number up to "36", when detecting the sensor measured value Sr, the processing unit 23 resets the pitch number to "1", which corresponds to the sensor measured value generated after the sampling timing of the detected sensor measured value Sr, and repeats increment of the pitch number from "1" to "36".

As another example, the communication unit 24 in the turning tool 100C transmits, to the processing device 200, measurement information including identification information of each cutting insert 1 as the phase information. More specifically, the processing unit 23 generates measurement information including insert number different for each cutting insert 1, the insert number indicating the cutting insert 1 by which a workpiece is being cut among multiple cutting inserts 1. The insert number is an example of identification information.

As described above, relative to when the cutting edge of the cutting insert 1 is not in contact with a workpiece, the sensor measured value generated by the processing unit 23 in the turning tool 100C has a high value when the cutting edge of the cutting insert 1A is in contact with the workpiece, has a low value when the cutting edge of the cutting insert 1B is in contact with the workpiece, has a low value when the cutting edge of the cutting insert 1C is in contact with the workpiece, and has a high value when the cutting edge of the cutting insert 1D is in contact with the workpiece. In short, the sensor measured value generated by the processing unit 23 varies periodically.

As described above, the processing unit 23 receives machining information from the processing device 200 through the wireless base unit 201 and the communication unit 24, and recognizes that the number N2 of cutting inserts 1 is four based on the received machining information.

Based on the result of comparison between two sensor measured values respectively generated at two consecutive sampling timings after the timing of the start of generation of sensor measured value, when sensor measured value Sf which has varied by a variation width greater than or equal to a predetermined value is detected, the processing unit 23 sets the pitch numbers to "1", which correspond to the sensor measured values generated after the sampling timing of the sensor measured value Sf.

Each time detecting a pair of two sensor measured values Sf respectively generated at temporally continuous sampling timings, the processing unit 23 increments the insert number corresponding to the sensor measured value. After incrementing the insert number up to "4", when detecting a pair of two sensor measured values Sf, the processing unit 23 resets the insert number to "1", and repeats increment of the pitch number from "1" to "4".

Specific Example 11 of Measurement Information

The communication unit 24 may be configured to transmit, to the processing device 200, measurement information including rotational phase information which corresponds to a measurement result, and relates to the phase of cutting machining between multiple convex portions in the gear member 50.

For example, the processing unit 23 generates measurement information including rotational phases [degree] during the time since the cutting edge of the cutting insert 1 comes into contact with a convex portion until the cutting edge comes into contact with another convex portion adjacent to the convex portion.

FIG. 20 is a chart illustrating an example of a rotational phase in measurement information generated by the processing unit according to the embodiment of the present disclosure. Referring to FIG. 20, based on the result of comparison between two sensor measured values respectively generated at two consecutive sampling timings after the timing of the start of generation of sensor measured value, the processing unit 23 detects sensor measured values Sr1, Sr2 which are two sensor measured values Sr. The sampling timing of the sensor measured value Sr1 and the sampling timing of the sensor measured value Sr2 are assumed to be temporally continuous in that order. For example, when generating M, for example, nine sensor measured values between the timing of generation of the sensor measured value Sr1 and the timing of generation of the sensor measured value Sr2, the processing unit 23 sets a rotational phase for each sensor measured value from the sensor measured value Sr1 to the sensor measured value generated immediately before the sensor measured value Sr2, the rotational phase being increased by 36 [degree] at a time, which is the value obtained by dividing 360 [degree] by (M+1), that is, "10".

The processing unit 23 then generates a sensor packet storing measurement information including rotational phases, and outputs the generated sensor packet to the communication unit 24.

Alternatively, the communication unit 24 may be configured to transmit, to the processing device 200, measurement information including rotational phase information which corresponds to a measurement result, and relates to the phase of cutting machining between multiple cutting inserts 1 in the turning tool 100C.

For example, the processing unit 23 generates measurement information including rotational phases [degree] during the time since the cutting edge of the cutting insert 1A comes into contact with a workpiece until the next cutting insert 1B comes into contact with the workpiece.

More specifically, based on the result of comparison between two sensor measured values respectively generated at two consecutive sampling timings after the timing of the start of generation of sensor measured value, the processing unit 23 detects sensor measured values Sf1, Sf2, Sf3 which are three sensor measured values Sf. The sampling timing of the sensor measured value Sf1, the sampling timing of the sensor measured value Sf2, and the sampling timing of the sensor measured value Sf3 are assumed to be temporally continuous in that order. For example, when generating nine sensor measured values between the timing of generation of the sensor measured value Sf1 and the timing of generation of the sensor measured value Sf3, the processing unit 23 sets a rotational phase for each sensor measured value from the sensor measured value Sf1 to the sensor measured value generated immediately before the sensor measured value Sf3, the rotational phase being increased by 36 [degree] at a time, which is the value obtained by dividing 360 [degree] by "10".

The processing unit 23 may be configured to output, to the communication unit 24, a sensor packet including any two or more of tool ID, voltage information, type ID, sensor ID, generation time, sequence number, cutting flag, pitch number, insert number and rotational phase.

[Processing Device]

Figure 21:
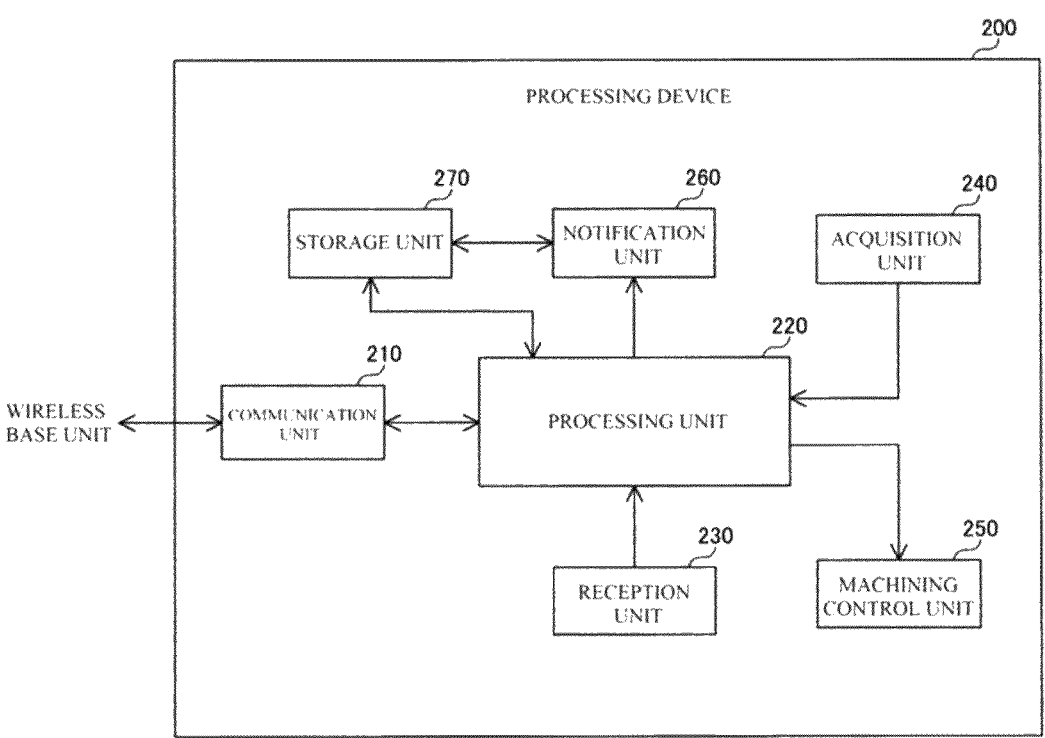
FIG. 21 is a diagram illustrating a configuration of a processing device according to an embodiment of the present disclosure.

FIG. 21 is a diagram illustrating a configuration of a processing device according to the embodiment of the present disclosure.

Referring to FIG. 21, the processing device 200 includes a communication unit 210, a processing unit 220, a reception unit 230, an acquisition unit 240, a machining control unit 250, a notification unit 260, and a storage unit 270. The communication unit 210 is implemented by a communication circuit such as an IC for communication, for example. The processing unit 220, the reception unit 230, the acquisition unit 240, the machining control unit 250, and the notification unit 260 are each implemented by a processor such as a CPU and a DSP, for example. The storage unit 270 is, for example, a non-volatile memory.

Upon receiving a sensor packet from the cutting tool 100 through the wireless base unit 201, the communication unit 210 acquires measurement information from the received sensor packet, and outputs the acquired measurement information to the processing unit 220.

Upon receiving the measurement information from the communication unit 210, the processing unit 220 stores the received measurement information in the storage unit 270 for each cutting tool 100.

The reception unit 230 receives machining information relating to the cutting tool 100 from a user.

For example, as the machining information, the reception unit 230 receives from a user the model number of a cutting section 10 having a cutting edge, in the cutting tool 100 attached to a machine tool, or the model number of the cutting insert 1 attached to the cutting section 10.

For example, the reception unit 230 receives machining results as the machining information from a user, the machining results indicating the presence or absence of damage of the cutting edge, amount of wear, the presence or absence of burr or roughness of cutting in a workpiece after completion of machining.

The reception unit 230 outputs the machining information received by an operation or the like of a user to the processing unit 220.

Upon receiving the machining information from the reception unit 230, the processing unit 220 stores the received machining information in the storage unit 270 for each cutting tool 100.

The acquisition unit 240 acquires the cutting information set in the machine tool.

For example, as the cutting information, the acquisition unit 240 acquires machining information, such as the number N1 of convex portions in the gear member 50 which is a workpiece, the ratio P [%] of the length of the convex portions to the sum of the length of the convex portions and the length of the concave portions of the gear member 50 in the outer circumferential direction, the number of revolutions R1 [rpm] of the gear member 50, the number N2 of cutting inserts 1 attached to the turning tool 100C, the diameter D [mm] of the turning tool 100C, the nominal depth of cut A [mm] which is a cutting width of the steel material 60, and the number of revolutions R2 [rpm] of the turning tool 100C.

For example, as the cutting information, the acquisition unit 240 acquires a numerical control (NC) program, a main shaft current value, information relating to rotation and stop of a workpiece, information relating to rotation and stop of the turning tool 100C, information relating to movement of the turning tool 100C, information indicating the presence or absence of coolant, information indicating the cutting tool used among multiple cutting tools attached to a turret, and other information in a machine tool.

For example, the acquisition unit 240 acquires the above-mentioned cutting information from a control unit which is not illustrated in the machine tool, and outputs the acquired cutting information to the processing unit 220.

Upon receiving the cutting information from the acquisition unit 240, the processing unit 220 stores the received cutting information in the storage unit 270 for each machine tool.

Upon receiving a machining information request from the processing unit 23 in the sensor module 20 through the wireless base unit 201 and the communication unit 210, the processing unit 220 acquires machining information from the storage unit 270. As a response to the machining information request, the processing unit 220 then transmits the machining information acquired from the storage unit 270 to the sensor module 20 through the communication unit 210 and the wireless base unit 201.

The processing unit 220 may be configured to calculate the above-mentioned period T1, and set the above-mentioned standby time T2 based on the information stored in the storage unit 270, and to transmit machining information to the sensor module 20 as a response to the machining information request through the communication unit 210 and the wireless base unit 201, the machining information including the period T1 and the standby time T2.

Also, the processing unit 220 may be configured to calculate the above-mentioned period T3, and set the above-mentioned standby time T4 based on the information stored in the storage unit 270, and to transmit machining information to the sensor module 20 as a response to the machining information request through the communication unit 210 and the wireless base unit 201, the machining information including the period T3 and the standby time T4.

The processing unit 220 processes the measurement information received from the cutting tool 100. For example, the processing unit 220 determines the state, for example, the deterioration state of the cutting section 10 or the cutting insert 1 in a corresponding cutting tool 100 based on the measurement information, the machining information and the cutting information in the storage unit 270, and outputs a result of the determination to the notification unit 260 and the machining control unit 250.

The notification unit 260 performs a process of notifying a user of the result of determination received from the processing unit 220 via display or voice. For example, the notification unit 260 further acquires measurement information from the storage unit 270, and performs a process of notifying a user of information such as the sensor measured values indicated by the acquired measurement information.

When the deterioration state of the cutting section 10 or the cutting insert 1, indicated by the result of determination received from the processing unit 220, meets a predetermined condition, the machining control unit 250 transmits stop notification or modification notification to a control unit in the machine tool, the stop notification indicating that machining should be stopped, the modification notification indicating that machining conditions should be modified.

[Flow of Operation]

The devices in a tool system according to the embodiment of the present disclosure each include a computer including a memory, and an arithmetic processing unit such as a CPU in the computer reads and executes a program from the memory, the program including part or whole of the steps of the following flowchart and sequence. Each of the programs of these multiple devices can be installed from the outside. Each of the programs of these multiple devices is distributed in a form of a recording medium storing the program.

Figure 22:
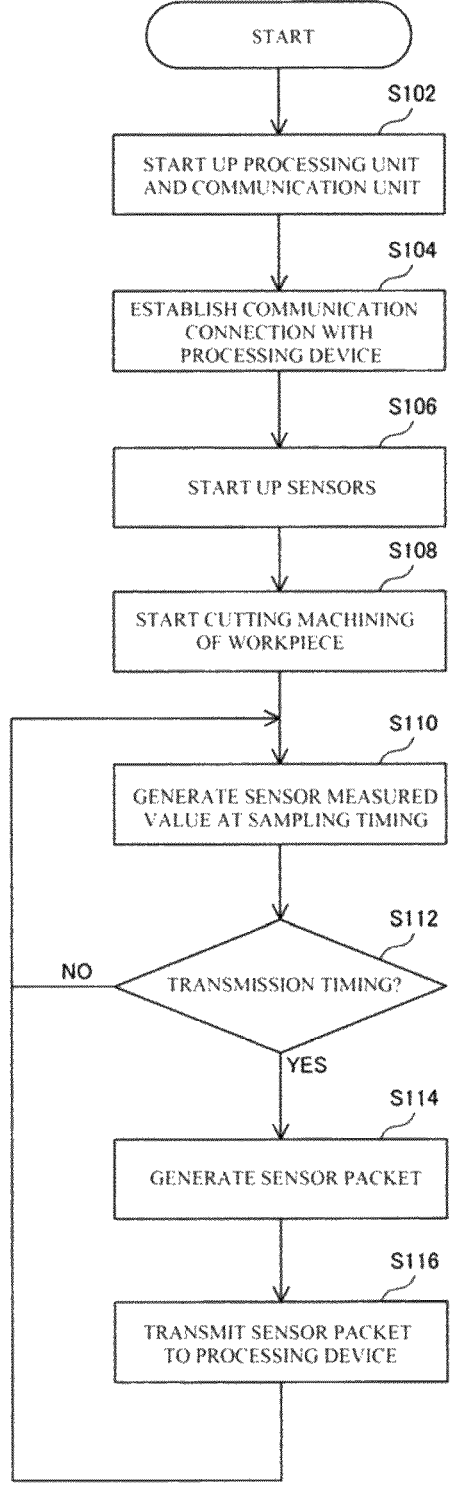
FIG. 22 is a flowchart defining an example of an operation procedure when a sensor packet is transmitted to the processing device by the cutting tool in the tool system according to an embodiment of the present disclosure.

FIG. 22 is a flowchart defining an example of an operation procedure when a sensor packet is transmitted to the processing device by the cutting tool in the tool system according to the embodiment of the present disclosure.

Referring to FIG. 22, first, the sensor module 20 in the cutting tool 100 is started up, and the circuits in the sensor module 20, such as the processing unit 23 and the communication unit 24, are started up (step S102).

Subsequently, the cutting tool 100 establishes a communication connection with the processing device 200 (step S104).

Subsequently, the cutting tool 100 starts up the acceleration sensor 21 and the strain sensor 22 (step S106).

Subsequently, the cutting tool 100 starts up cutting machining of a workpiece (step S108).

Subsequently, the cutting tool 100 generates a sensor measured value at a sampling timing in accordance with the generation period Ta. For example, the cutting tool 100 accumulates the generated sensor measured value in the storage unit 25 (step S110).

Subsequently, the cutting tool 100 repeats generation of sensor measured value until a transmission timing of measurement information (NO in step S112), acquires the sensor measured values accumulated in the storage unit 25 at the transmission timing (YES in step S112), and generates a sensor packet storing measurement information including the acquired sensor measured values (step S114).

Subsequently, the cutting tool 100 transmits, to the processing device 200, the measurement information relating to measurement results of the sensors at the time of cutting machining. In other words, the cutting tool 100 transmits the generated sensor packet to the processing device 200 (step S116).

Subsequently, the cutting tool 100 repeats generation of sensor measured value until the next transmission timing (step S110).

Figure 23:
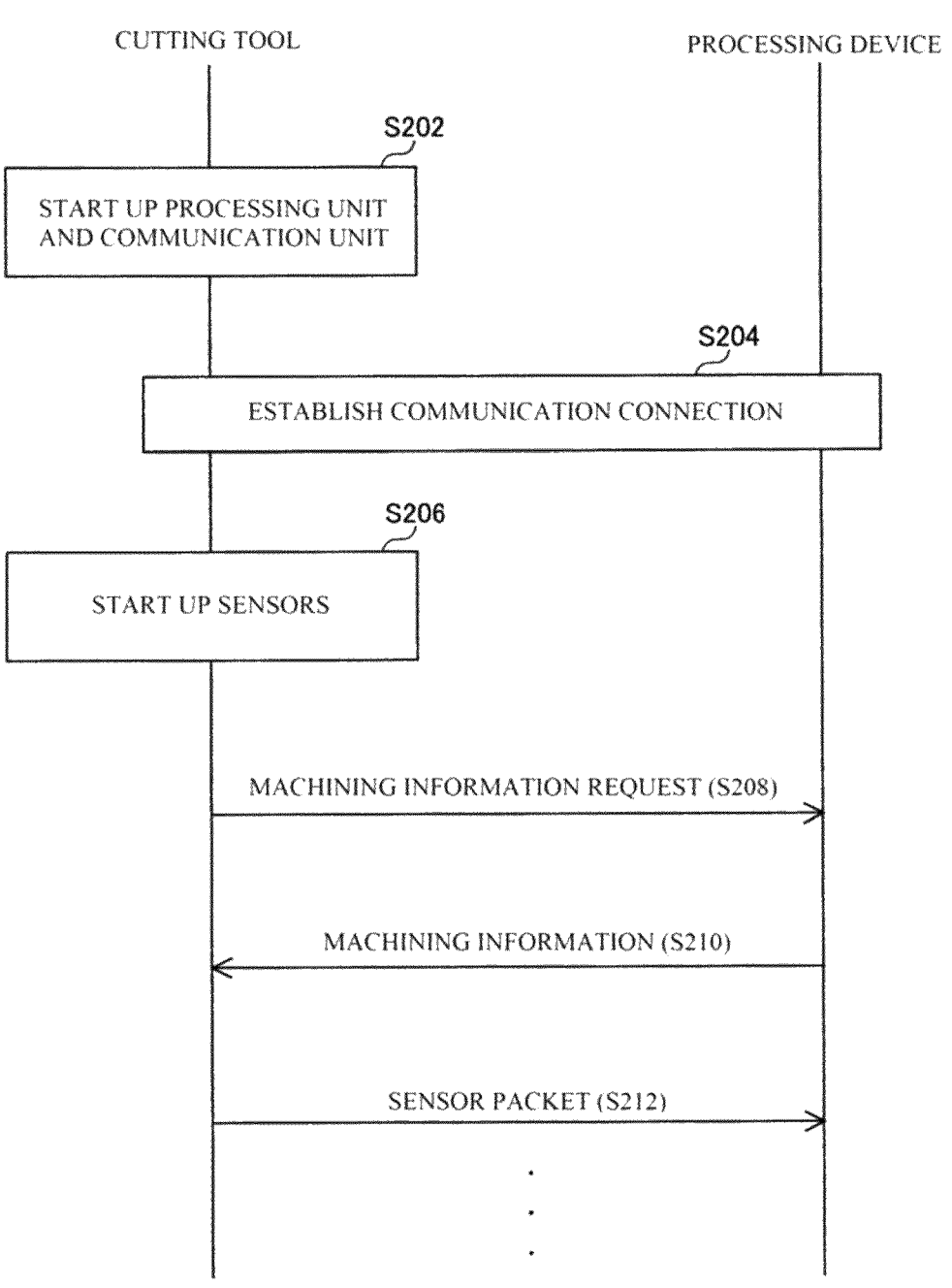
FIG. 23 is a chart illustrating an example of a communication processing sequence in the tool system according to an embodiment of the present disclosure.

FIG. 23 is a chart illustrating an example of a communication processing sequence in the tool system according to the embodiment of the present disclosure.

Referring to FIG. 23, first, the sensor module 20 in the cutting tool 100 is started up, and the circuits in the sensor module 20, such as the acceleration sensor 21, the strain sensor 22, the processing unit 23 and the communication unit 24, are started up (step S202).

Subsequently, the processing device 200 and the cutting tool 100 establishes a communication connection (step S204).

Subsequently, the cutting tool 100 starts up the acceleration sensor 21 and the strain sensor 22 (step S206).

Subsequently, the cutting tool 100 transmits a machining information request to the processing device 200 (step S208).

Subsequently, the processing device 200 receives the machining information request, and transmits machining information to the cutting tool 100 (step S210).

Subsequently, the cutting tool 100 transmits a sensor packet including measurement information to the processing device 200 at a transmission timing determined based on the machining information received from the processing device 200 (step S212).

In the tool system 300 according to the embodiment of the present disclosure, the cutting tool 100 is configured to transmit a sensor packet to the processing device 200 through the wireless base unit 201. However, the present disclosure is not limited to this. The cutting tool 100 may be configured to transmit a sensor packet to the processing device 200 via a wired transmission path. Specifically, the communication unit 24 in the sensor module 20 of the cutting tool 100 may be configured to transmit a sensor packet storing measurement information to the processing device 200 via a wired transmission path.

Meanwhile, a technique is desired that can implement an excellent function related to determination of the state of the cutting edge of a cutting tool.

To cope with this, in the cutting tool 100 according to the embodiment of the present disclosure, the cutting section 10 has a cutting edge. The acceleration sensor 21 and the strain sensor 22 are provided in the cutting section 10. The communication unit 24 is provided in the cutting section 10. The communication unit 24 transmits, to the processing device 200 provided outside the cutting tool 100, measurement information relating to measurement results of the acceleration sensor 21 and the strain sensor 22 and including serial numbers corresponding to the measurement results after the timing of the start of cutting by the cutting edge.

In the tool system 300 according to the embodiment of the present disclosure, the cutting tool 100 includes the acceleration sensor 21, the strain sensor 22 and the communication unit 24. The processing device 200 is installed outside the cutting tool 100. The cutting tool 100 transmits, to the processing device 200, measurement information relating to the measurement results of the acceleration sensor 21 and the strain sensor 22 and including serial numbers corresponding to the measurement results after the timing of the start of cutting by the cutting edge. The processing device 200 processes the measurement information received from the cutting tool 100.

The cutting information transmission method according to the embodiment of the present disclosure is a cutting information transmission method in the cutting tool 100 including: a cutting section 10 having a cutting edge; and the acceleration sensor 21 and the strain sensor 22 which are provided in the cutting section 10. In the cutting information transmission method, the cutting tool 100 first performs cutting machining on a workpiece by the cutting section 10. Next, the cutting tool 100 transmits, to the processing device 200 provided outside the cutting tool 100, measurement information relating to measurement results of the acceleration sensor 21 and the strain sensor 22 at the time of cutting machining and including serial numbers corresponding to the measurement results after the timing of the start of cutting by the cutting edge.

In this manner, the state of the cutting edge can be determined by the configuration and the method of transmitting measurement information from the cutting tool 100 to the processing device 200 based on the information, such as machining conditions, owned by a machine tool with the cutting tool 100 attached for example, and the measurement information from the cutting tool 100 in the processing device 200. Thus, the state of the cutting edge can be determined more accurately, as compared to the configuration of determining the state of the cutting edge based on the measurement information only. For example, in the configuration of wirelessly transmitting measurement information to the processing device by the configuration and method of transmitting, to the processing device, measurement information including serial numbers corresponding to measurement results, even when reception order in the processing device is not linked to the measurement order due to retransmission or the like of the measurement information, it is possible to recognize the measurement order of the measurement results accurately in the processing device. By the configuration and method of transmitting, to the processing device, measurement information including serial numbers corresponding to the measurement results after the timing of the start of cutting by the cutting edge, the measurement results after the start of cutting machining can be easily extracted and analyzed in the processing device.

Therefore, with the cutting tool, the tool system and the cutting information transmission method according to the embodiment of the present disclosure, it is possible to implement an excellent function related to determination of the state of the cutting edge of the cutting tool.

The above-described embodiments are to be considered as examples and non-restrictive in all aspects. The scope of the present invention is indicated not by the above description but by the claims, and is intended to include all changes within the meaning and scope equivalent to the claims.

The above description includes the features given below.

APPENDIX 1

A cutting tool including:
a cutting section to which a cutting insert having a cutting edge is attachable or which has a cutting edge itself;
a sensor provided in the cutting section; and
a communication unit provided in the cutting section, wherein
the communication unit transmits, to a processing device provided outside the cutting tool, measurement information relating to a measurement result of the sensor,
the cutting tool further includes:
a processing unit that generates the measurement information; and
a non-volatile memory,
the communication unit is implemented by an IC for communication, and
the processing unit is implemented by a CPU.

APPENDIX 2

A tool system including:
a cutting tool including a sensor and a communication unit; and
a processing device installed outside the cutting tool, wherein
the cutting tool transmits, to the processing device, measurement information relating to a measurement result of the sensor,
the processing device processes the measurement information received from the cutting tool,
the cutting tool further includes:
a processing unit that generates the measurement information; and
a non-volatile memory,
the communication unit is implemented by an IC for communication, and
the processing unit is implemented by a CPU.

REFERENCE SIGNS LIST

1 cutting insert
3A fixing member
3B fixing member
3C fixing member
5 cutting edge
10 cutting section
20 sensor module
21 acceleration sensor
22 strain sensor
23 processing unit
24 communication unit
25 storage unit
29 battery
50 gear member
60 steel material
100 cutting tool
200 processing device
201 wireless base unit
210 communication unit
220 processing unit
230 reception unit
240 acquisition unit

250 machining control unit
260 notification unit
270 storage unit
300 tool system
401 sensor packet

The invention claimed is:

1. A cutting tool comprising:
a cutting section having a cutting edge;
a sensor provided in the cutting section;
a processor; and
a transmitter provided in the cutting section, wherein
the transmitter is configured to transmit, to a processing
device provided outside the cutting tool, measurement
information including a measurement result of the
sensor and a serial number of the measurement result
measured after a start of cutting by the cutting edge,
the processor is configured to determine the start of
cutting by the cutting edge based on the measurement
result that is measured in a first timing and the mea-
surement result that is measured in a second timing
directly before the first timing,
the measurement results measured in or after the first
timing are in order numbered with different serial
numbers, the transmitter transmits the measurement
information including the different serial numbers to
the processing device based on an instruction by the
processor, and
the processor is further configured to generate the mea-
surement result of the sensor and not transmit the
measurement result to the transmitter when the cutting
edge is in contact with a workpiece and to transmit the
measurement result to the transmitter and not generate
the measurement result when the cutting edge is not in
contact with the workpiece.

2. The cutting tool according to claim 1, wherein the
transmitter is configured to transmit, to the processing
device, measurement information including determination
information which corresponds to the measurement result
and indicates whether the measurement result is for when
cutting is carried out by the cutting edge.

3. The cutting tool according to claim 1, wherein the
cutting tool includes a plurality of sensors, and
the transmitter is configured to transmit the measurement
information including identification information of the
sensors to the processing device.

4. The cutting tool according to claim 1, wherein the
transmitter is configured to transmit the measurement infor-
mation including a measurement time corresponding to the
measurement result to the processing device.

5. The cutting tool according to claim 1, wherein the
cutting tool further includes a battery provided in the cutting
section,
the sensors are configured to be driven by electric power
supplied from the battery, and
the transmitter is further configured to transmit voltage
information indicating a voltage of the battery to the
processing device.

6. The cutting tool according to claim 1, wherein the
transmitter is configured to transmit, to the processing
device, the measurement information including a plurality of
measurement results, each of which is the measurement
result, at different measurement timings.

7. The cutting tool according to claim 1, wherein the
transmitter is configured to transmit, to the processing
device for every generation period of the measurement
result, the measurement information including the corre-
sponding single measurement result.

8. The cutting tool according to claim 1, wherein the
transmitter is configured to transmit, to the processing
device for every period of an integral multiple of the
generation period of the measurement result, the measure-
ment information including corresponding one or multiple
ones of the measurement results.

9. The cutting tool according to claim 1, wherein the
cutting tool is a tool for turning machining, used to machine
a rotating workpiece, and
the transmitter is configured to transmit the measurement
information including corresponding one or multiple
ones of the measurement results to the processing
device at a timing in accordance with a number of
revolutions of the workpiece.

10. The cutting tool according to claim 9, wherein the
transmitter is configured to transmit, to the processing
device, the measurement information including phase infor-
mation which corresponds to the measurement result, and
relates to a phase of cutting machining after the timing of the
start of cutting by the cutting edge.

11. The cutting tool according to claim 10, wherein a
plurality of projections are formed on an outer circumfer-
ence of the workpiece, and
the transmitter is configured to transmit, to the processing
device, the measurement information including identi-
fication information of the projections as the phase
information.

12. The cutting tool according to claim 11, wherein the
transmitter is configured to transmit, to the processing
device, the measurement information including rotational
phase information which corresponds to the measurement
result, and relates to the phase of cutting machining between
the plurality of projections.

13. The cutting tool according to claim 1, wherein the
cutting tool is a tool for rotational machining, used to
machine a fixed workpiece, and
the transmitter is configured to transmit the measurement
information including corresponding one or multiple
ones of the measurement results to the processing
device at a timing in accordance with a number of
revolutions of the cutting tool.

14. A tool system comprising:
the cutting tool according to claim 1; and
a processing device installed outside the cutting tool,
wherein
the cutting tool transmits, to the processing device, the
measurement information relating to the measurement
result of the sensor and including the serial number
corresponding to the measurement result after a timing
of the start of cutting by the cutting edge, and
the processing device processes the measurement infor-
mation received from the cutting tool.

15. A cutting information transmission method for the
cutting tool according to claim 1, the method comprising:
a step of performing cutting machining on a workpiece by
the cutting section; and
a step of transmitting, to the processing device provided
outside the cutting tool, the measurement information
relating to the measurement result of the sensor at a
time of the cutting machining and including the serial
number corresponding to the measurement result after
a timing of the start of cutting by the cutting edge.

16. The cutting tool according to claim 1, wherein:

the processor includes a storage unit, the processor is further configured to accumulate a predetermined number of measurement results of the sensor in the storage unit and then transmit a packet of the measurement results to the transmitter.

17. The cutting tool according to claim 1, wherein:

the processing device is configured to transmit machining information to the sensor, and the machining information includes a number of convex portions in a gear member, a ratio of a length of the convex portions to a sum of a length of the convex portions and a length of the convex portions of the gear member in an outer circumferential direction, and a number of revolutions of the gear member.

18. A cutting tool for turning machining, used to machine a rotating workpiece, the cutting tool comprising:

a cutting section having a cutting edge;

a sensor provided in the cutting section;

a processor; and a transmitter provided in the cutting section, wherein the transmitter is configured to transmit, to a processing device provided outside the cutting tool, measurement information including a measurement result of the sensor and a serial number of the measurement result measured after a start of cutting by the cutting edge, the transmitter is configured to transmit the measurement information including corresponding one or multiple ones of the measurement results to the processing device at a timing in accordance with a number of revolutions of the workpiece, and the processor is configured to generate the measurement result of the sensor and not transmit the measurement result to the transmitter when the cutting edge is in contact with the workpiece and to transmit the measurement result to the transmitter and not generate the measurement result when the cutting edge is not in contact with the workpiece.

\* \* \* \* \*